United States Patent
Saito

(10) Patent No.: US 10,502,871 B2
(45) Date of Patent: Dec. 10, 2019

(54) LIGHT FLUX CONTROLLING MEMBER, LIGHT-EMITTING DEVICE, ILLUMINATION APPARATUS, AND MOLD

(71) Applicant: Enplas Corporation, Saitama (JP)

(72) Inventor: Tomohiro Saito, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 864 days.

(21) Appl. No.: 14/888,307

(22) PCT Filed: Apr. 14, 2014

(86) PCT No.: PCT/JP2014/060630
§ 371 (c)(1),
(2) Date: Oct. 30, 2015

(87) PCT Pub. No.: WO2014/178278
PCT Pub. Date: Nov. 6, 2014

(65) Prior Publication Data
US 2016/0077244 A1    Mar. 17, 2016

(30) Foreign Application Priority Data

May 2, 2013 (JP) ................. 2013-096863
Jun. 27, 2013 (JP) ................. 2013-135054

(51) Int. Cl.
*G02B 3/08* (2006.01)
*B29C 33/38* (2006.01)
(Continued)

(52) U.S. Cl.
CPC ............ *G02B 3/08* (2013.01); *B29C 33/3842* (2013.01); *B29C 33/42* (2013.01);
(Continued)

(58) Field of Classification Search
CPC ...... G02B 3/08; G02B 13/00; B29C 33/3842; B29C 33/42; F21Y 2115/10; B29K 2905/00; F21V 5/045
(Continued)

(56) References Cited

U.S. PATENT DOCUMENTS 3,502,865 A * 3/1970 Matteson ................. F21V 5/02
362/309
2014/0355273 A1  12/2014 Saito

FOREIGN PATENT DOCUMENTS

JP   59-173902 A   10/1984
JP   11-065490 A   3/1999
(Continued)

OTHER PUBLICATIONS

International Search Report from International Application No. PCT/JP2014/060630 dated Jul. 8, 2014.

*Primary Examiner* — Karabi Guharay
*Assistant Examiner* — Jessica M Apenteng
(74) *Attorney, Agent, or Firm* — Brundidge & Stanger, P.C.

(57) ABSTRACT

In a light flux controlling member (140), light emitted from a light-emitting element enters from an incidence region (141), and is emitted from an emitting region (142). The light-incidence region (141) includes a plurality of protrusions. The protrusions have ridgelines that are connected between two of four virtual lines that are adjacent to each other, the virtual lines joining an intersecting point and a vertex point of diagonal lines of a first virtual quadrangle. Valleys are formed between the plurality of protrusions. The planar shape of the ridge lines is an arc, and the radius of curvature of the ridge lines is greater than the distance from the intersection point of the diagonal lines of the first virtual quadrangle to the midpoint of the ridge lines.

13 Claims, 33 Drawing Sheets

(51) Int. Cl.
*B29C 33/42* (2006.01)
*G02B 13/00* (2006.01)
*F21V 5/04* (2006.01)
*F21Y 115/10* (2016.01)

(52) U.S. Cl.
CPC ........... *B29K 2905/00* (2013.01); *F21V 5/045* (2013.01); *F21Y 2115/10* (2016.08); *G02B 13/00* (2013.01)

(58) Field of Classification Search
USPC .................................................. 362/311.06
See application file for complete search history.

(56) References Cited

FOREIGN PATENT DOCUMENTS

| | | |
|---|---|---|
| JP | 2011-192494 A | 9/2011 |
| JP | 2012-181542 A | 9/2012 |
| WO | 2013/111534 A1 | 8/2013 |

\* cited by examiner

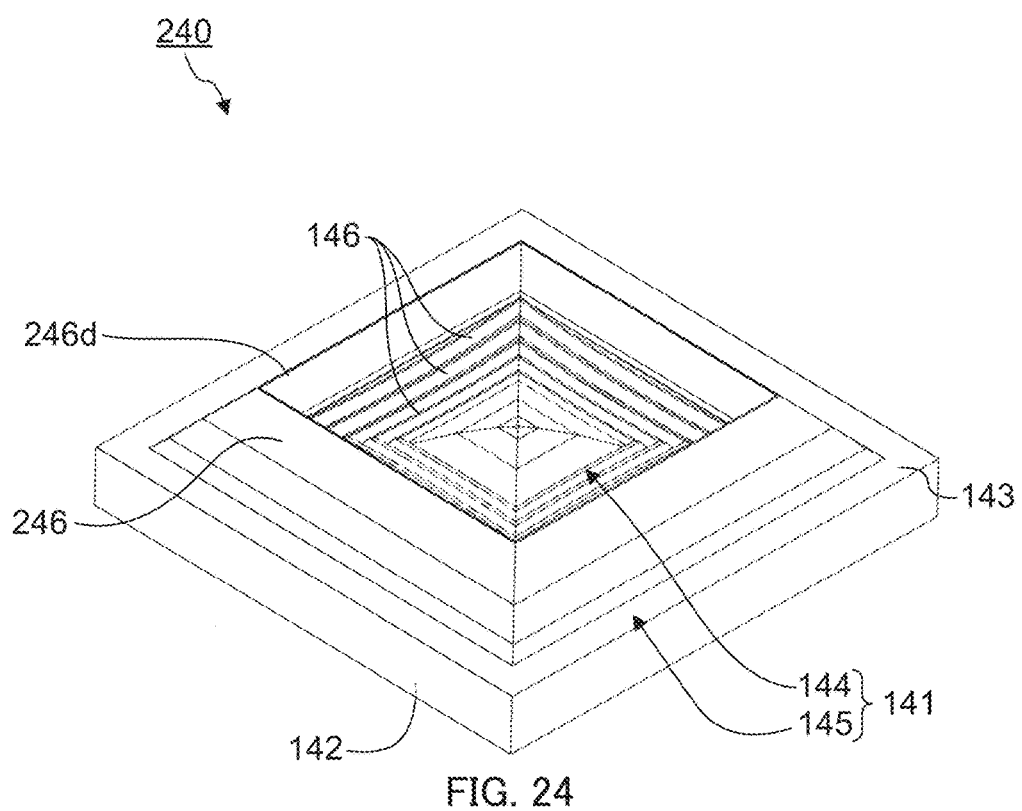

LIGHT FLUX CONTROLLING MEMBER, LIGHT-EMITTING DEVICE, ILLUMINATION APPARATUS, AND MOLD

TECHNICAL FIELD

The present invention relates to a light flux controlling member that controls a distribution of light emitted from a light emitting element, a light-emitting device and an illumination apparatus including the light flux controlling member, and a mold for forming the light flux controlling member.

BACKGROUND ART

In recent years, in view of energy saving and miniaturization, light emitting devices (LED flashes) using a light-emitting diode (hereinafter also referred to as "LED") as a light source have been increasingly used for a light emitting device in an imaging camera. For example, light emitting devices using a combination of an LED and a Fresnel lens are known.

In general, the shape of the imaging region of an imaging camera is quadrangle. Accordingly, in order to obtain a clear image, it is preferable that a light-emitting device illuminate an irradiation region in a quadrangular shape. Therefore, a Fresnel lens used in a light-emitting device of an imaging camera is required to uniformly and efficiently irradiate the quadrangular irradiation region with light emitted from a light emitting element. Conventionally, various Fresnel lenses for illuminating a quadrangular irradiation region have been proposed (see, for example, PTLS 1 and 2).

FIG. 1A is a perspective view of Fresnel lens 10 disclosed in PTL 1. Fresnel lens 10 illustrated in FIG. 1A has the same function as cylindrical lens 20 illustrated in FIG. 1B. As illustrated in FIG. 1A, in Fresnel lens 10, a plurality of grooves 12 each having a rectangular shape in plan view are concentrically formed in a spaced relationship.

FIG. 1C is a plan view of Fresnel lens 30 disclosed in PTL 2. As illustrated in FIG. 1C, Fresnel lens 30 includes first condenser lens 40 disposed at a center portion, and second condenser lens 50 disposed on the outer side of first condenser lens 40. First condenser lens 40 is divided into three regions. In both end regions, a plurality of grooves 42 each having a semicircular shape in plan view are concentrically formed in a spaced relationship. In a center region, a plurality of cylindrical lenses 44 are formed. In second condenser lens 50, a plurality of grooves 52 each having a circular shape in plan view are concentrically formed in a spaced relationship.

CITATION LIST

Patent Literature

PTL 1
Japanese Patent Application Laid-Open No. 11-065490
PTL 2
Japanese Patent Application Laid-Open No. 2012-181542

SUMMARY OF INVENTION

Technical Problem

Fresnel lens 10 and Fresnel lens 30 are provided with linear protrusions and recesses. The light collection performance of the linear Fresnel portions is roughly determined by the length of the straight line and the inclination angle of the inclined surfaces of the protrusions and the recesses. Therefore, the design flexibility of the linear Fresnel portion is low.

In addition, when a metal mold for a commonly used Fresnel lens having a circular shape in plan view is produced, protrusions and recesses are formed by curvilinear processing such as lathe processing. Therefore, normally, a Fresnel lens for illuminating a circular irradiation region can be manufactured with a processing machine for curvilinear processing.

Meanwhile, when a metal mold for Fresnel lens 10 is produced, protrusions and recesses may be formed by linear processing. In addition, when a metal mold for Fresnel lens 30 is produced, protrusions and recesses may be formed by both of linear processing and curvilinear processing. Therefore, at least a processing machine for linear processing is required when manufacturing Fresnel lenses 10 and 30.

In particular, manufacturing of Fresnel lens 30 requires both of the processing machine for linear processing and the processing machine for curvilinear processing. For this reason, a processing machine for linear processing may be required to be additionally prepared to manufacture a Fresnel lens for illuminating a quadrangular irradiation region.

It should be noted that, in linear processing, the processing speed of a processing machine suitable for linear Fresnel processing of a certain size (height of 0.5 mm or greater, for example) is typically faster than the processing speed of a processing machine for fine curvilinear processing. In view of this, when the existing processing machine for linear processing can be effectively utilized, an advantage can be obtained in view of reduction in processing time.

An object of the present invention is to provide a light flux controlling member which can uniformly and efficiently irradiate an illuminated surface having a quadrangular shape with light emitted from a light emitting element, and whose Fresnel portion can be quite freely designed.

An other object of the present invention is to provide a light-emitting device and an illumination apparatus including the light flux controlling member.

Still another object of the present invention is to provide a mold for manufacturing the light flux controlling member which does not necessarily require a processing machine for linear processing.

Solution to Problem

A light flux controlling member according to embodiments of the present invention controls a distribution of light emitted from a light emitting element, the light flux controlling member including: an incidence region on which light emitted from the light emitting element is incident; and an emission region from which light incident on the incidence region is emitted, wherein the incidence region includes a plurality of protrusions each having a ridgeline connecting two adjacent first virtual lines of four first virtual lines, each of the four first virtual lines connecting a vertex of a first virtual quadrangle with an intersection of diagonals of the first virtual quadrangle, the protrusions are disposed such that every two of the protrusions adjacent to each other have a valley part between the two adjacent first virtual lines, at least one of the ridgelines has an arc shape in plan view, and the at least one ridgeline having the arc shape has a curvature radius greater than a distance from the intersection to a middle point of the ridgeline.

A light-emitting device according to embodiments of the present invention includes: a light emitting element; and the light flux controlling member according to embodiments of the present invention, wherein the intersection is on an optical axis of the light emitting element.

An illumination apparatus according to embodiments of the present invention includes: the light-emitting device according to embodiments of the present invention; and a cover configured to allow light emitted from the light-emitting device to pass therethrough while diffusing the light.

A mold according to embodiments of the present invention for molding the light flux controlling member according to embodiments of the present invention includes an incidence region molding region for molding the incidence region, wherein the incidence region molding region includes a plurality of recesses each having a valley line connecting two adjacent second virtual lines of four second virtual lines, each of the four second virtual lines connecting a vertex of a second virtual quadrangle with an intersection of diagonals of the second virtual quadrangle, the recesses are disposed such that every two of the recesses adjacent to each other have a top part between the two adjacent second virtual lines, at least one of the valley lines has an arc shape in plan view, and the at least one valley line having the arc shape has a curvature radius greater than a distance from the intersection of the diagonals of the second virtual quadrangle to a middle point of the valley line.

Advantageous Effects of Invention

A Fresnel portion of the light flux controlling member according to embodiments of the present invention has high design flexibility, and therefore the light flux controlling member according to embodiments of the present invention can be manufactured without using a processing machine for linear processing. Further, the light flux controlling member according to the embodiments of the present invention can uniformly and efficiently illuminate a quadrangular irradiation region with light with a curved Fresnel. In addition, the light-emitting device and the illumination apparatus of the embodiments of the present invention can uniformly and efficiently illuminate a quadrangular irradiation region with light.

BRIEF DESCRIPTION OF DRAWINGS

FIG. 24 is a perspective view of a light flux controlling member according to Embodiment 3;

DESCRIPTION OF EMBODIMENTS

In the following, embodiments of the present invention will be described in detail with reference to the accompanying drawings.

Embodiment 1

(Configurations of Light Flux Controlling Member and Light-Emitting Device)

Figure 1A:
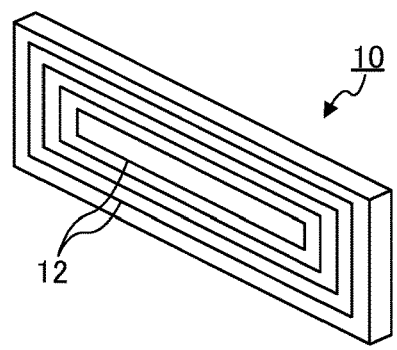
FIGS. 1A to 1C illustrate a configuration of a conventional lens disclosed in PTL.
Figure 1B:
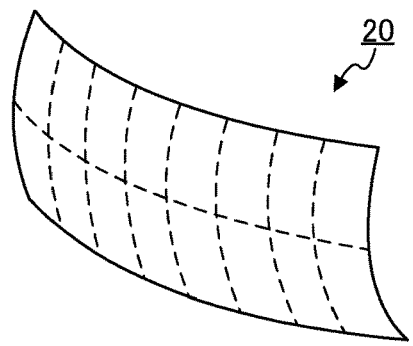
Figure 1C:
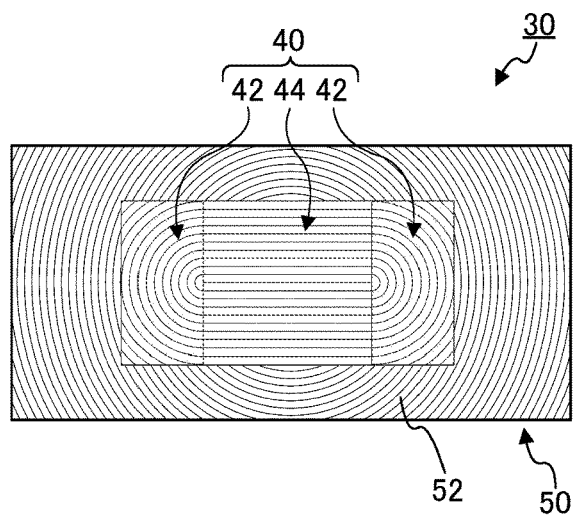
Figure 2:
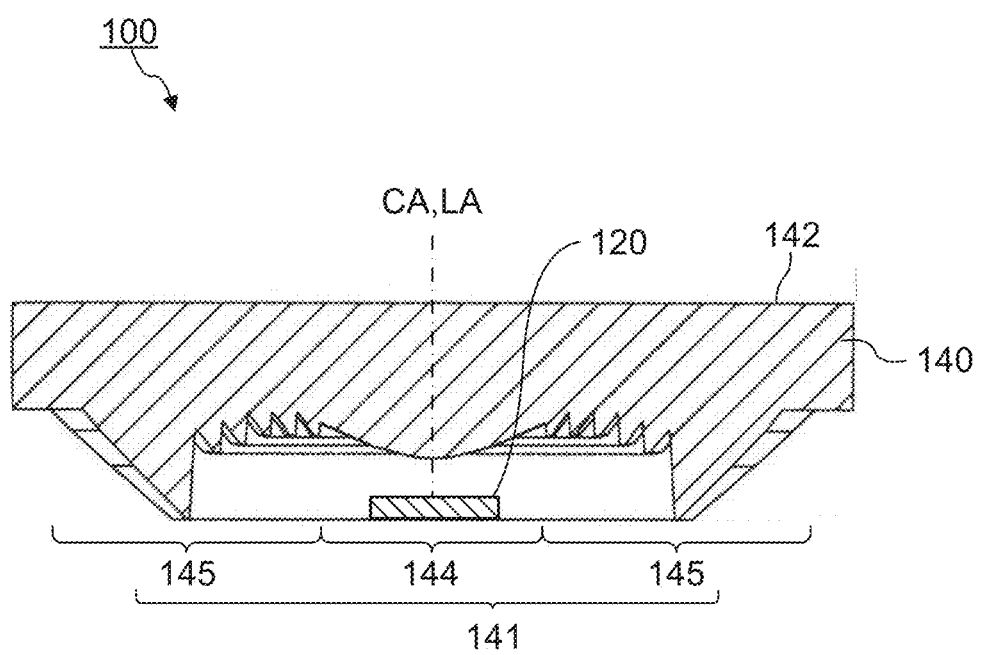
FIG. 2 is a sectional view of a light-emitting device of Embodiment 1 of the present invention.

FIG. 2 is a sectional view of light-emitting device 100 according to Embodiment 1 of the present invention. As illustrated in FIG. 2, light-emitting device 100 includes light emitting element 120 and light flux controlling member 140. Light emitting element 120 is a light-emitting diode (LED) such as a white light-emitting diode, for example. Light flux controlling member 140 controls the distribution of light emitted from light emitting element 120. Light flux controlling member 140 is disposed such that its central axis CA is coincide with optical axis LA of light emitting element 120.

The material of light flux controlling member 140 is not limited as long as light having a desired wavelength can pass therethrough. Examples of the material of light flux controlling member 140 include: light transmissive resins such as polymethylmethacrylate (PMMA), polycarbonate (PC), and epoxy resin (EP); or glass. As described in detail later, light flux controlling member 140 is formed by injection molding, for example.

Figure 3:
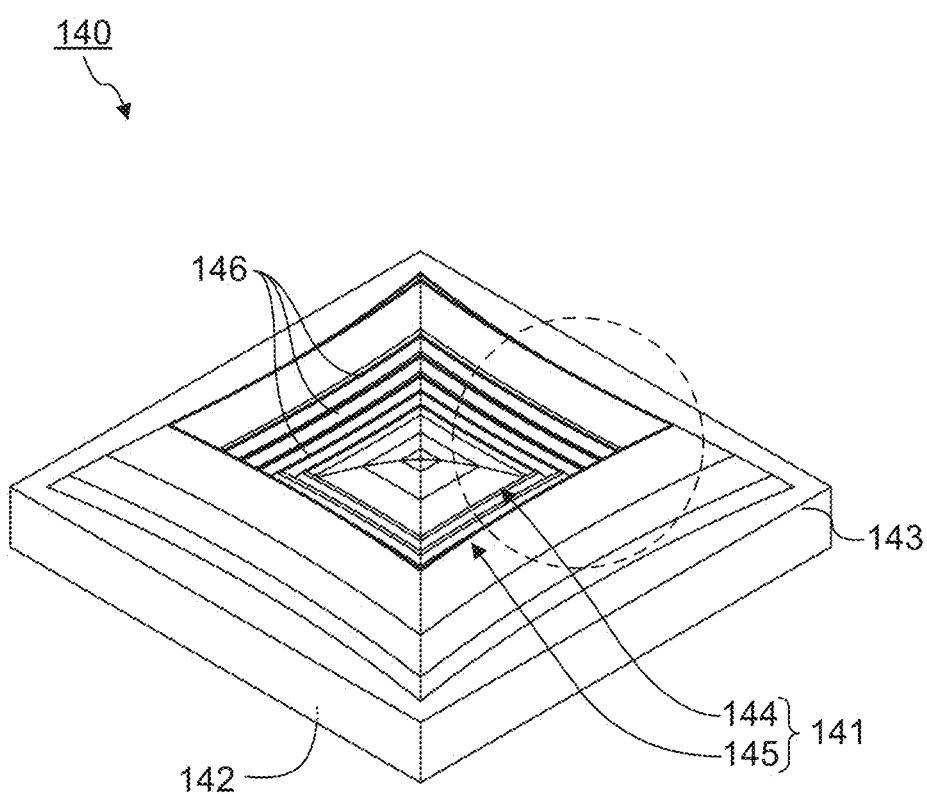
FIG. 3 is a perspective view of a light flux controlling member according to Embodiment 1 of the present invention.

FIG. 3 to FIG. 6B illustrate a configuration of light flux controlling member 140 according to Embodiment 1. FIG. 3 is a perspective view of light flux controlling member 140 according to Embodiment 1. FIGS. 4A to 4C are a plan view, a side view, and a bottom view of light flux controlling member 140, respectively, and FIG. 4D is a bottom view of light flux controlling member 140 in which refraction part 144 and Fresnel lens part 145 are omitted. FIG. 5A is a sectional view taken along line A-A of FIG. 4C, and FIG. 5B is an enlarged view of a part indicated by of a broken line in FIG. 5A. FIG. 6A is an enlarged view of a part indicated by a broken line in FIG. 3, and FIG. 6B in an enlarged view of a part indicated by a broken line in FIG. 4C.

Figure 4A:
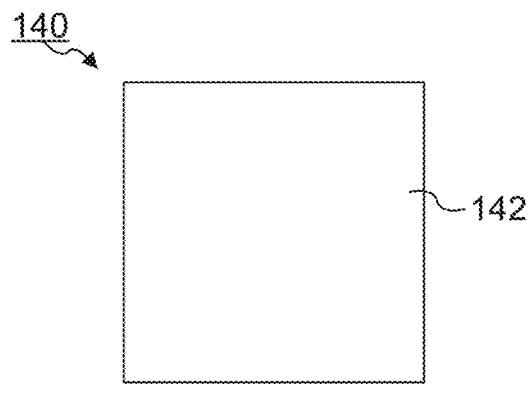
FIGS. 4A to 4D illustrate a configuration of the light flux controlling member according to Embodiment 1.
Figure 4B:
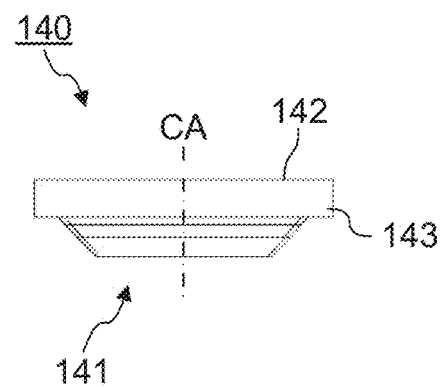
Figure 4C:
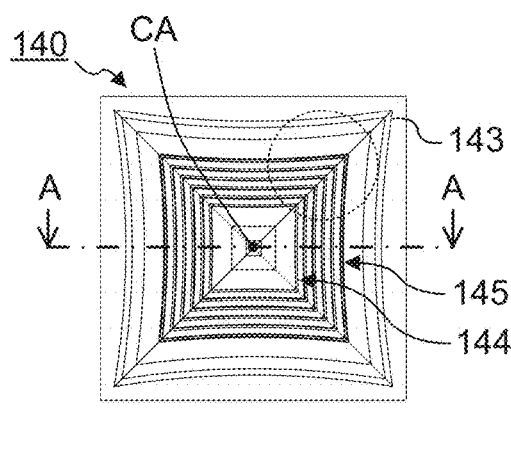
Figure 4D:
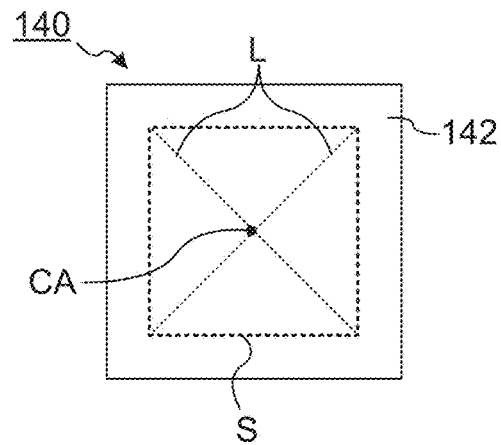

As illustrated in FIG. 3 to FIG. 4D, light flux controlling member 140 includes incidence region 141 on which light emitted from light emitting element 120 is incident, and emission region 142 which is provided on the side opposite to incidence region 141 and from which the light incident on incidence region 141 emits. Flange 143 may be provided between incidence region 141 and emission region 142.

The shape of light flux controlling member 140 in plan view is not limited. As illustrated in FIGS. 4A to 4D, light flux controlling member 140 of the present embodiment has a square shape in plan view. In addition, the length of each side of light flux controlling member 140 of the present embodiment is about 4.7 mm.

Light emitted from light emitting element 120 is incident on incidence region 141. Incidence region 141 includes refraction part 144 provided at a center portion of incidence region 141, and Fresnel lens part 145 provided on the outer side of refraction part 144.

Refraction part 144 allows part of light emitted from light emitting element 120 (light emitted at a small angle with respect to optical axis LA) to enter light flux controlling member 140, and refracts the incident light toward emission region 142. Refraction part 144 is disposed at a position facing light emitting element 120 to intersect with central axis CA of light flux controlling member 140 (optical axis LA of light emitting element 120) (see FIG. 2).

It is to be noted that the shape of refraction part 144 is not limited as long as the above-mentioned function can be achieved. For example, refraction part 144 may have a shape of a refractive Fresnel lens. In addition, the surface of refraction part 144 may be spherical or aspherical. In the present embodiment, refraction part 144 has an aspherical surface, and refraction part 144 has a substantially square pyramidal shape (see FIGS. 2 and 3).

Fresnel lens part 145 allows part of light emitted from light emitting element 120 (light emitted at a large angle with respect to optical axis LA) to enter light flux controlling member 140, and reflects the incident light toward emission region 142. Fresnel lens part 145 includes a plurality of protrusions 146 that control the travelling direction of light emitted from light emitting element 120.

As illustrated in FIG. 4D, it is assumed that Fresnel lens part 145 is provided with virtual quadrangle S (first virtual quadrangle). In this manner, virtual quadrangle S is set to include incidence region 141 in plan view. For example, virtual quadrangle S is set such that when viewed in plan, the four corners of virtual quadrangle S coincide with the four corners of Fresnel lens part 145 having a substantially rectangular shape. The center of virtual quadrangle S (intersection of the diagonals) is on central axis CA of light flux controlling member 140.

In addition, it is assumed that four virtual lines L (first virtual lines) that connect the vertexes and the intersection of the diagonals of virtual quadrangle S are provided. Virtual quadrangle S and four virtual lines L serve as references for installment of a plurality of protrusions 146. Protrusions 146 are disposed such that they connect two adjacent virtual lines L. In addition, protrusions 146 are disposed such that a valley part is formed between two adjacent protrusions 146 in a region between two adjacent virtual lines L (see FIG. 4C).

Figure 5A:
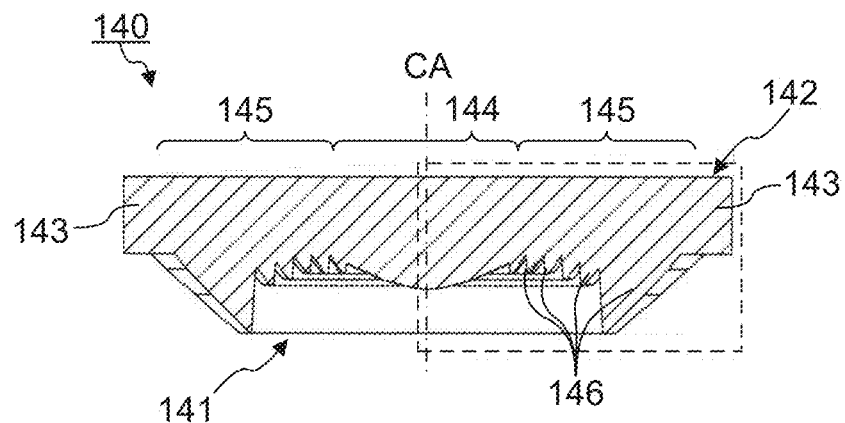
FIGS. 5A and 5B are sectional views of the light flux controlling member according to Embodiment 1.
Figure 5B:
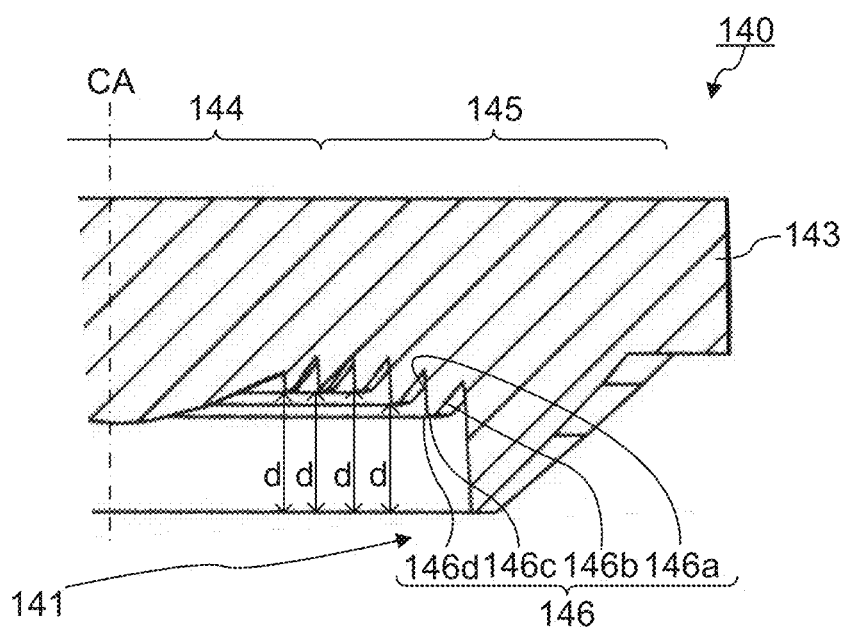
Figure 6A:
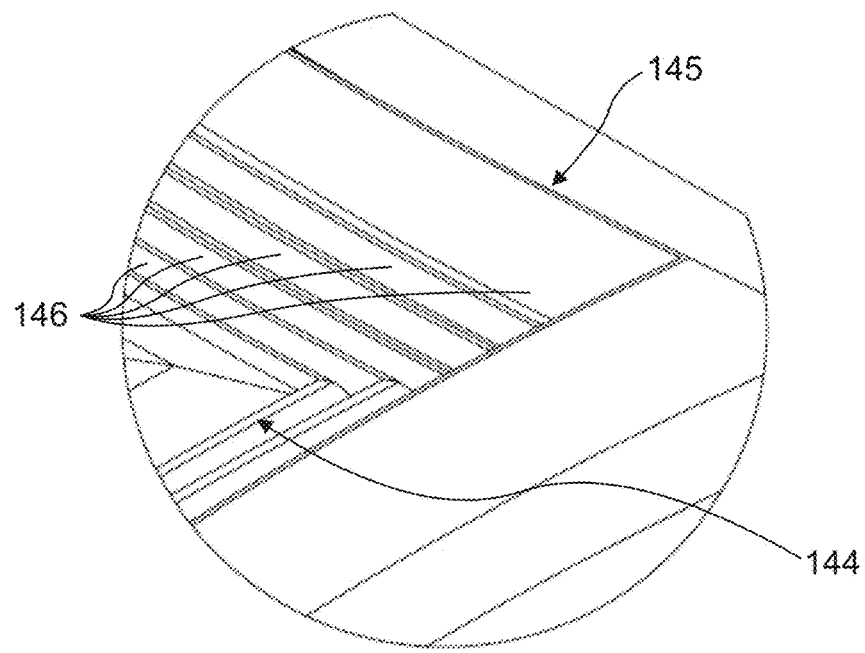
FIGS. 6A and 6B are partially enlarged views of the light flux controlling member according to Embodiment 1.
Figure 6B:
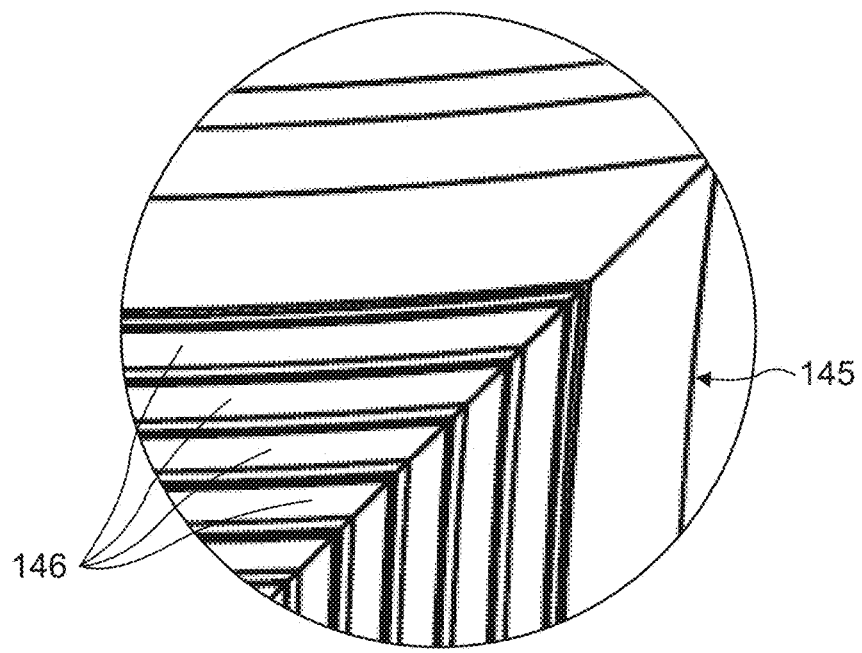

The shape and size of protrusions 146 are not limited, and protrusions 146 may be of different shape and/or size. As illustrated in FIGS. 5A and 5B, in the present embodiment, the outermost protrusion 146 has a size greater than that of protrusions 146 disposed on the inside (central axis CA side) to control light emitted at a large angle with respect to optical axis LA with light flux controlling member 140 without leaking the light. Protrusions 146 disposed on the inside have the same size (see FIG. 5B). In addition, in optical axis LA direction, distance d between the lower end of light flux controlling member 140 and ridgelines 146d (distance d from reference surface to ridgeline 146d) gradually decreases from the inside to the outside (see FIG. 5B).

Protrusion 146 includes first inclined surface 146a, second inclined surface 146b, third inclined surface 146c and ridgeline 146d. In protrusion 146, first inclined surface 146a is disposed on the inner side (central axis CA side), and second inclined surface 146b is disposed on the outer side (see FIG. 5B).

First inclined surface 146a is an incidence surface on which light emitted from light emitting element 120 is incident, and refracts the light toward second inclined surface 146b side. In a cross section orthogonal to central axis CA (horizontal cross section), first inclined surface 146a is a curved line that protrudes to central axis CA side. As described in detail later, first inclined surface 146a is tilted such that it goes toward the lower end portion of light flux controlling member 140 as the distance from central axis CA increases.

As described later, in view of manufacturing a mold for injection molding, the inclination angle is preferably greater than 0° and 10° or smaller in any cross section including central axis CA. Preferably, the inclination angle of first inclined surface 146a is 5° or smaller, more preferably, 3° or smaller. In a cross section (vertical cross section) including central axis CA, first inclined surface 146a may be a straight line or a curve. It is to be noted that, when first inclined surface 146a is a curve in the cross section including central axis CA, the "angle of first inclined surface 146a" is the angle of the tangent to first inclined surface 146a at the light incident point.

Second inclined surface 146b is a reflection surface that reflects the light incident on first inclined surface 146a toward emission region 142. In a cross section (horizontal cross section) orthogonal to central axis CA, second inclined surface 146b is a curve protruding toward the central axis CA side. In a cross section (vertical cross section) including central axis CA, second inclined surface 146b may be a straight line or a curve. It is to be noted that, when second inclined surface 146b is a curve in the cross section including central axis CA, the "angle of second inclined surface 146b" is the angle of the tangent to second inclined surface 146b at the light incident point.

Third inclined surface 146c is a surface that connects first inclined surface 146a and second inclined surface 146b. In a cross section (vertical cross section) including central axis CA, third inclined surface 146c may be a straight line or a curve. It is also possible to directly connect first inclined surface 146a with second inclined surface 146b without forming third inclined surface 146c. It is to be noted that, when third inclined surface 146c is a curve in a cross section including central axis CA, the "angle of third inclined surface 146c" is the angle of the tangent to third inclined surface 146c at the light incident point.

Ridgeline 146d is a boundary line between first inclined surface 146a and third inclined surface 146c. It is to be noted that, when third inclined surface 146c is not formed, ridgeline 146d is a boundary line between first inclined surface 146a and second inclined surface 146b. When third inclined surface 146c is provided between first inclined surface 146a and second inclined surface 146b and the acute angle portion is eliminated, the manufacturing performance is improved.

In plan view, ridgeline 146d has an arc shape. The curvature radius of the arc (ridgeline 146d) is greater than the distance from the intersection of the diagonals of virtual quadrangle S to the middle point of ridgeline 146d. To be more specific, the radius of the circle including the arc is preferably 15 mm to 150 mm. More preferably, the radius of the arc is 100 mm or smaller.

As described later, in the case where the radius of the arc is smaller than 15 mm, the cutting tool and the mold easily interfere with each other at the time when a recess is formed during manufacture of the mold, thus making it difficult to perform processing. On the other hand, in the case where the radius of the arc is greater than 150 mm, the distance from the rotation center of the processing machine to the processed part increases, thus making it difficult to maintain the processing accuracy of protrusion 146. In view of this, in the present invention, protrusion 146 is formed such that the curvature radius of the arc is sufficiently large with respect to the length (4.7 mm) of one side of light flux controlling member 140. In this manner, it is possible to obtain light flux controlling member 140 having light collection characteristics comparable to the light collection characteristics of light flux controlling member 140 provided with a protrusion whose ridgeline has a linear shape.

Further, by adjusting the curvature radius of the arc, it is possible to adjust the difference between the light distribution characteristics in a direction along a side of virtual quadrangle S and the light distribution characteristics in a direction along the diagonal of virtual quadrangle S. For example, when the arc has a large curvature radius (or when ridgeline 146d is a substantially straight line), the region irradiated with the light emitted from light flux controlling member 140 has a quadrangular shape. When the arc has a small curvature radius (or when the center of the diagonal of virtual quadrangle S and the curvature center are close to each other), the region irradiated with the light emitted from light flux controlling member 140 has a substantially circular shape.

In addition, ridgeline 146d is provided so as to protrude toward the central axis CA side in plan view (see FIG. 4C). That is, the curvature center of the arc is located at a position on a straight line that passes through the center of virtual quadrangle S (intersection of the diagonals) and the middle point of one side of virtual quadrangle S, and on the outer side of outermost protrusion 146. Further, as mentioned above, the curvature radius of the arc is set to a value larger than the distance between the intersection of the diagonals of virtual quadrangle S and the middle point of one side of the virtual quadrangle.

It is to be noted that, in the present embodiment, ridgelines 146d between two virtual lines L have the same curvature center. As described, the performance of light collection can be adjusted by allowing or not allowing the arc to protrude toward central axis CA side. When the shape of the arc protrudes toward central axis CA side as in the present embodiment, the brightness at the four corners, where the brightness tends to be reduced, in the quadrangular irradiation region may be compensated in comparison with the case where ridgeline 146d is formed of a linear protrusion.

Emission region 142 is a plane formed on the irradiation region side opposite to light emitting element 120 side. Emission region 142 is formed such that it intersects with central axis CA of light flux controlling member 140 (see FIG. 4B). Toward the irradiation region, emission region 142 emits light which is incident on refraction part 144, and light which is incident on first inclined surface 146a of Fresnel lens part 145 and then reflected by second inclined surface 146b.

As described above, in light flux controlling member 140 of the present embodiment, a plurality of protrusions 146 are formed such that ridgelines 146d each have an arc shape in plan view. That is, ridgeline 146d is not linear, and therefore, when light flux controlling member 140 of the present embodiment is manufactured with use of a mold, the recess of the mold corresponding to protrusion 146 of light flux controlling member 140 can be manufactured with use of a processing machine for curvilinear processing.

(Simulation)

Figure 7A:
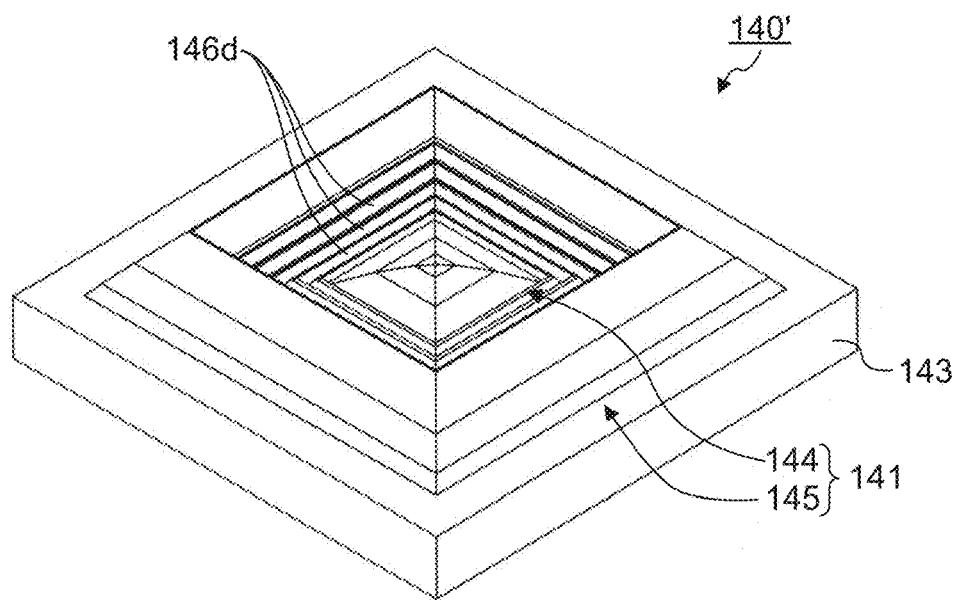
FIGS. 7A and 7B illustrate a configuration of a light flux controlling member for comparison.
Figure 7B:
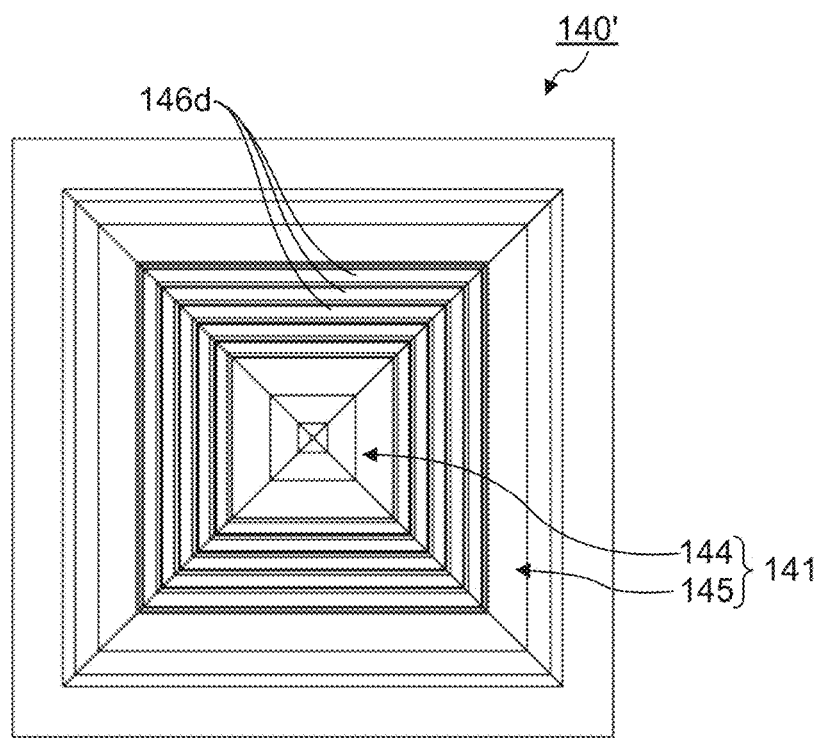

The illuminance distribution and the light distribution of light-emitting device 100 including light flux controlling member 140 according to Embodiment 1 illustrated in FIG. 3 to FIG. 6B were simulated. In addition, for comparison, the illuminance distribution and the light distribution of a light-emitting device including light flux controlling member 140' illustrated in FIGS. 7A and 7B whose ridgeline 146d has a linear shape were also simulated.

Figure 8A:
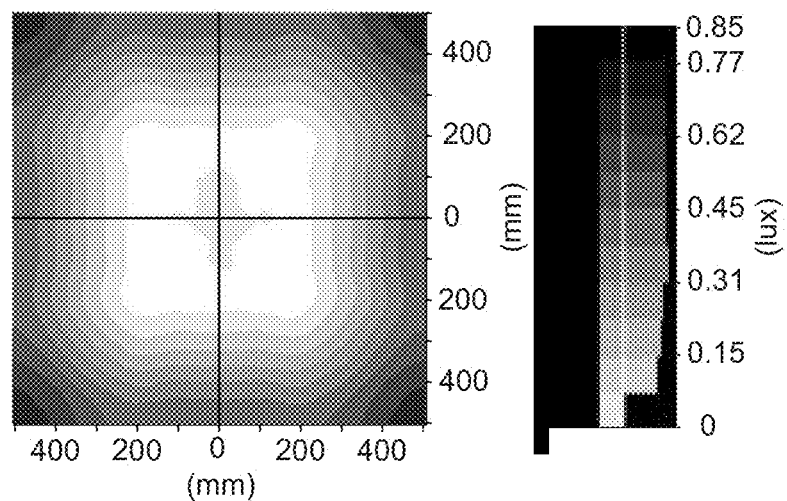
FIGS. 8A and 8B show simulations of an illuminance distribution of the light-emitting device of an embodiment of the present invention and a simulation of an illuminance distribution of a light-emitting device for comparison.
Figure 8B:
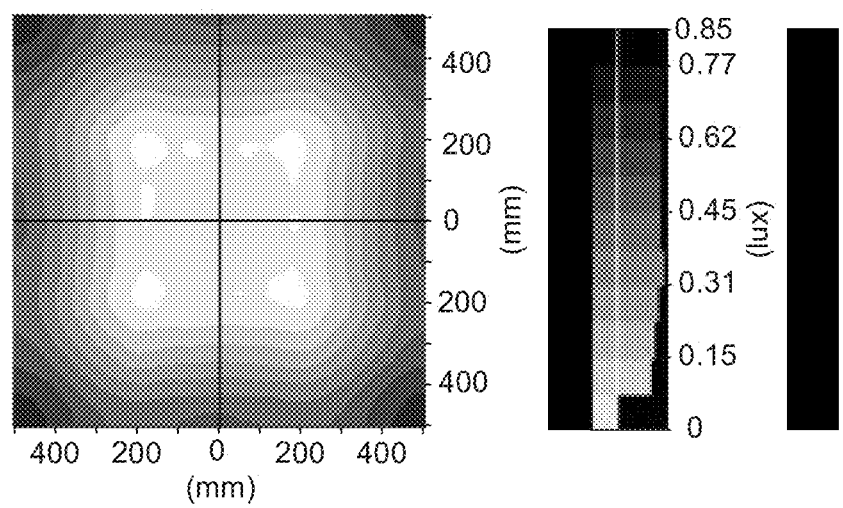

FIGS. 8A and 8B show simulations of an illuminance distribution of light-emitting device 100 according to the present embodiment and a simulation of a light-emitting device for comparison. FIG. 8A shows a simulation of an illuminance distribution of the light-emitting device for comparison, and FIG. 8B shows a simulation of an illuminance distribution of light-emitting device 100 according to the present embodiment. An irradiation region distanced from the light emitting surface of light emitting element 120 by 1,000 mm was assumed in the simulation of the illuminance distribution. In the left diagrams of FIGS. 8A and 8B, the ordinate and abscissa indicate the distances (mm) from optical axis LA (central axis CA of light flux controlling members 140 and 140') of light emitting element 120. In addition, in the right diagrams, the ordinate indicates the illuminance (lux).

FIG. 8A reveals that a light-emitting device having light flux controlling member 140' for comparison whose ridgeline 146*d* is a straight line can illuminate the irradiation region in a quadrangle (square) shape. In addition, FIG. 8B reveals that light-emitting device 100 having light flux controlling member 140 of the present embodiment whose ridgeline 146*d* has an arc shape also can illuminate the irradiation region in a quadrangular (square) shape as with light flux controlling member 140'.

Figure 9A:
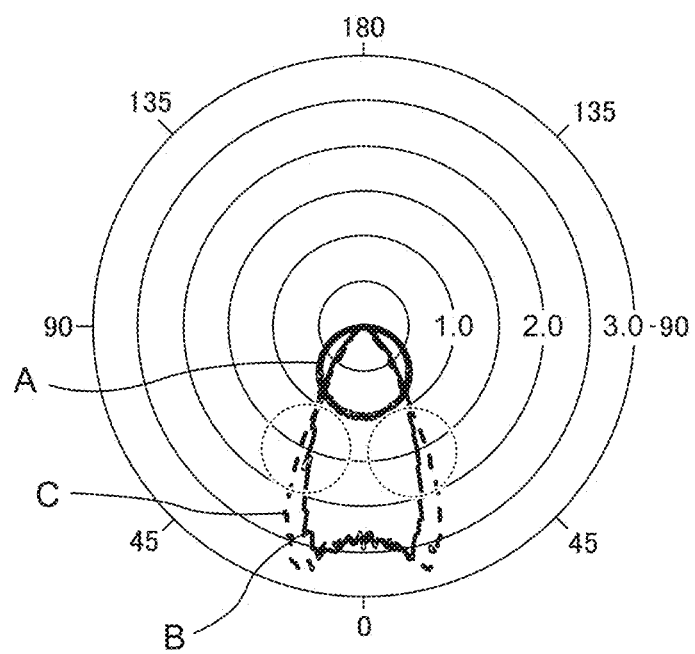
FIGS. 9A and 9B show simulations of a light distribution of the light-emitting device of an embodiment of the present invention and a simulation of a light distribution of the light-emitting device for comparison.
Figure 9B:
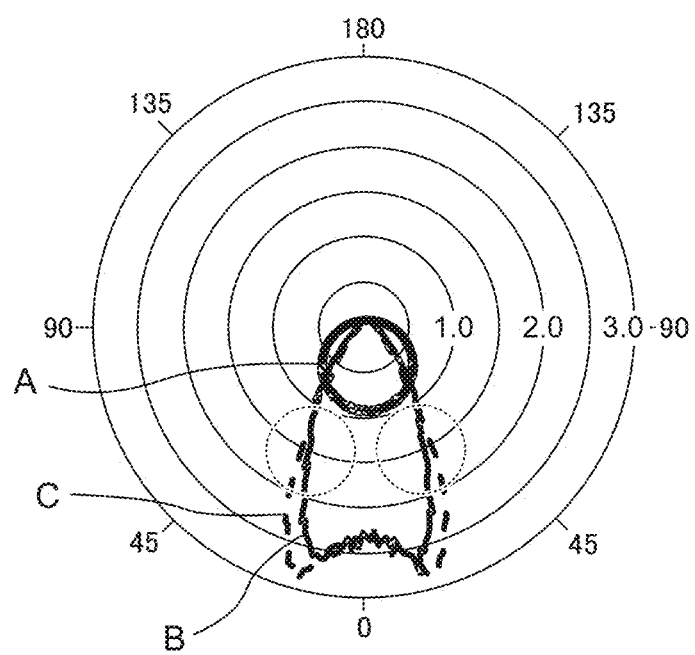

FIGS. 9A and 9B show simulations of a light distribution of light-emitting device 100 according to the present embodiment and a simulation of a light-emitting device for comparison. FIG. 9A shows a simulation of a light distribution of a far field of a light-emitting device for comparison. FIG. 9B shows a simulation of a light distribution of a far field of light-emitting device 100 according to the present embodiment.

In FIGS. 9A and 9B, the distance from the center of the circle indicates the relative luminous intensity when the luminous intensity in the emission direction along optical axis LA of light emitting element 120 (0° direction) is defined as "1." In addition, the scales in the circumferential direction indicate the angles to optical axis LA of light emitting element 120. In FIGS. 9A and 9B, thick solid line A indicates the light distribution characteristics of light emitting element 120, thin solid line B indicates the light distribution characteristics in the direction orthogonal to central axis CA and parallel to one side of virtual quadrangle S, and broken line C indicates the light distribution characteristics in the direction of the diagonal of virtual quadrangle S.

Comparing the distance between broken line C and thin solid line B in the circumferential direction in the regions enclosed by a broken line in FIG. 9A with the distance between broken line C and thin solid line B in the circumferential direction in a region enclosed by a broken line in FIG. 9B, the distance between broken line C and thin solid line B of light-emitting device 100 according to the present embodiment is greater than that of the light-emitting device for comparison. This result indicates that light-emitting device 100 according to the present embodiment can irradiate the four corners of the quadrangular irradiation region with a larger amount of light in comparison with the light-emitting device for comparison. In view of this, light-emitting device 100 according to the present embodiment can uniformly illuminate the quadrangular irradiation region in comparison with the light-emitting device for comparison.

(Configuration of Mold)

Next, a mold for forming light flux controlling member 140 according to Embodiment 1 is described.

The mold for forming light flux controlling member 140 includes first metal mold 500 for forming incidence region 141 of light flux controlling member 140. First metal mold 500 is composed of a combination of four first metal mold pieces 580.

Figure 10:
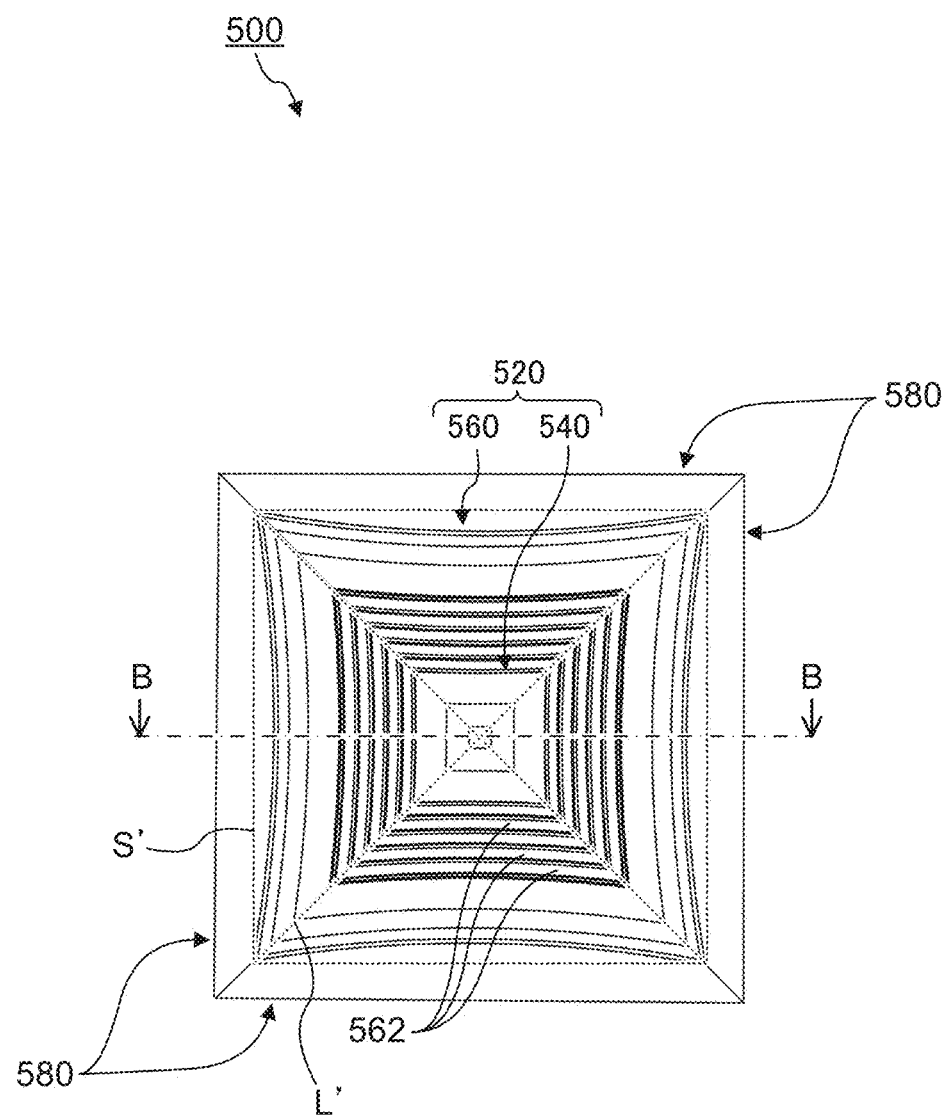
FIG. 10 is a plan view of a first metal mold according to Embodiment 1.
Figure 11A:
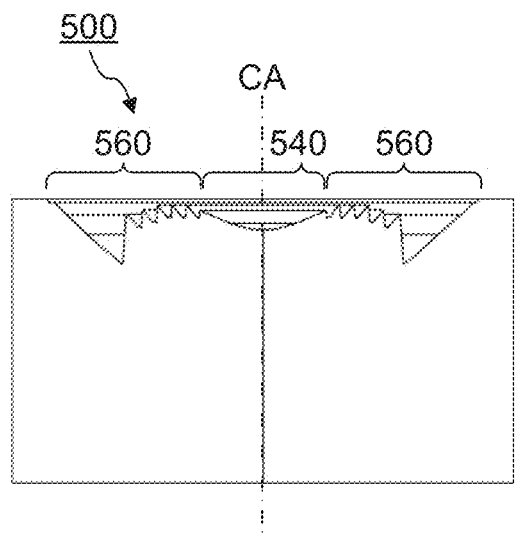
FIGS. 11A to 11D illustrate a configuration of the first metal mold according to Embodiment 1.
Figure 11B:
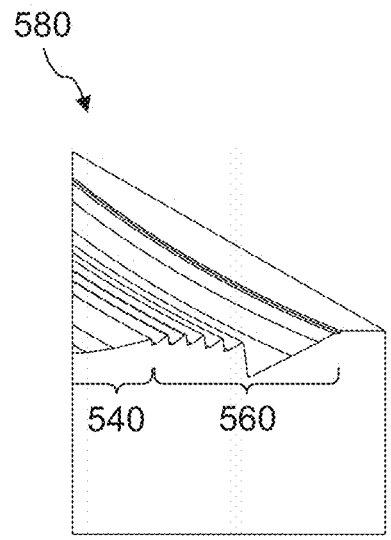
Figure 11C:
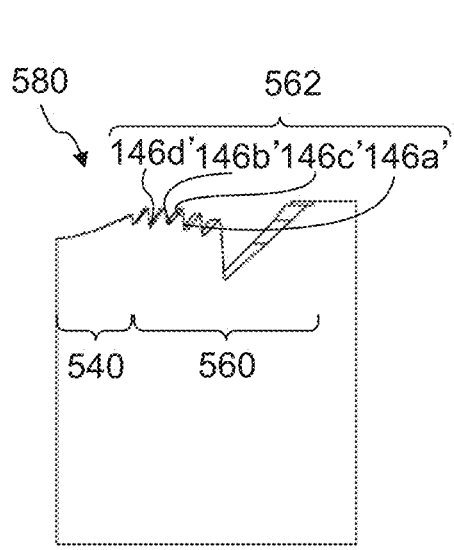
Figure 11D:
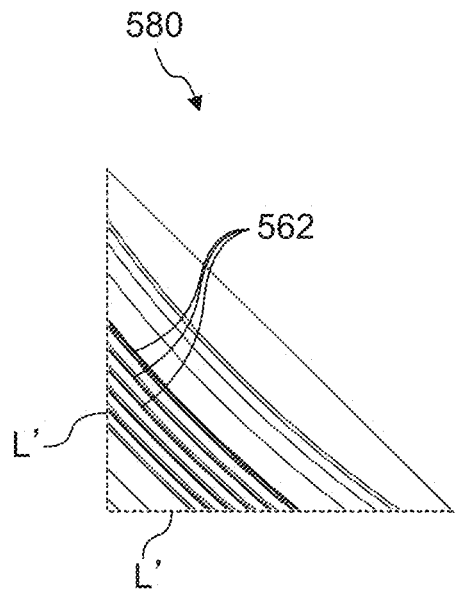

FIG. 10 to FIG. 11D illustrate a configuration of first metal mold 500. FIG. 10 is a plan view of first metal mold 500. FIG. 11A is a sectional view taken along line B-B of FIG. 10, FIG. 11B is a perspective view of first metal mold piece 580, FIG. 11C is a side view of first metal mold piece 580, and FIG. 11D is a plan view of first metal mold piece 580.

First metal mold 500 includes incidence region forming region 520 that corresponds to the shape of the incidence region 141 side of light flux controlling member 140. Incidence region forming region 520 includes refraction part forming region 540 for forming refraction part 144, and Fresnel lens part forming region 560 for forming Fresnel lens section 145. While refraction part forming region 540 and Fresnel lens part forming region 560 are integrally formed in first metal mold 500 according to the present embodiment, refraction part forming region 540 and Fresnel lens part forming region 560 may be formed as separated members.

Fresnel lens part forming region 560 includes a plurality of recesses 562 corresponding to a plurality of protrusions 146. It is assumed that Fresnel lens part forming region 560 is provided with virtual quadrangle S' (second virtual quadrangle) corresponding to virtual quadrangle S. In this manner, virtual quadrangle S' is set to include incidence region forming region 520 in plan view. For example, virtual quadrangle S' is set such that the four corners of virtual quadrangle S' and the four corners of Fresnel lens part forming region 560 having a substantially rectangular shape are located at the same positions.

In addition, it is assumed that a plurality of virtual lines L' (second virtual lines) which correspond to virtual lines L (first virtual lines) and extend from the center (intersection of the diagonals) to the vertexes of virtual quadrangle S' are provided. Virtual quadrangle S' and virtual lines L' serve as references for installment of a plurality of recesses 562. Recesses 562 are disposed so as to connect two adjacent virtual lines L'. In addition, recesses 562 are disposed such that a top part is formed between two adjacent recesses 562 between adjacent virtual lines L'.

Recesses 562 include first inclined surface 146*a*' corresponding to first inclined surface 146*a*, second inclined surface 146*b*' corresponding to second inclined surface 146*b*, third inclined surface 146*c*' corresponding to third inclined surface 146*c*, and valley line 146*d*' corresponding to ridgeline 146*d*. As described above, in view of manufacturing first metal mold 500 (first metal mold piece 580), it is preferable that first inclined surface 146*a*' be inclined with respect to central axis CA by an angle which is greater than 0° and is equal to or smaller than 10° in the cross section including central axis CA to prevent interference between the cutting tool and the working surface.

In addition, in the present embodiment, the radius of the arc of light flux controlling member 140 is 15 mm or greater. With this configuration, the cutting tool does not interfere with first inclined surface 146*a*', and consequently light flux controlling member 140 can be accurately manufactured. In plan view, valley line 146*d*' has an arc shape. The curvature radius of the arc (valley line 146*d*') is greater than the distance from the intersection of the diagonal of virtual quadrangle S' to the middle point of valley line 146*d*'. In addition, valley line 146*d*' is provided to protrude to the inside of first metal mold 500.

As described above, first metal mold 500 is composed of a combination of four first metal mold pieces 580. As illustrated in FIGS. 11B to 11D, first metal mold piece 580 has a shape which is obtained by cutting first metal mold 500 in a plane including central axis CA and virtual line L'. In plan view, first metal mold piece 580 has a shape of rectangular equilateral triangle. In plan view, valley line 146*d*' is provided to protrude toward the connecting part of two virtual lines L'. By combining four first metal molds 580 such that virtual lines L' are aligned, first metal mold 500 is formed.

For example, first metal mold 500 is used together with a second metal mold for forming emission region 142 of light flux controlling member 140. The second metal mold (which is omitted in the drawing) has a shape corresponding to the shape of the emission region 142 side of light flux controlling member 140. The second metal mold is mold-clamped with first metal mold 500, whereby a cavity having the shape of light flux controlling member 140 is formed.

(Manufacturing Method of First Metal Mold)

Next, a manufacturing method of first metal mold 500 is described. The manufacturing method of first metal mold 500 is roughly categorized into two methods by the manufacturing method of first metal mold piece 580. In the first manufacturing method, one metal plate (working material) is subjected to lathe processing, and thereafter the metal plate is cut to manufacture first metal mold piece 580. In the second manufacturing method, a metal piece cut out in advance is fitted to a jig and subjected to lathe processing, and thereafter removed from the jig to manufacture first metal mold piece 580. In the both manufacturing methods, four first metal mold pieces 580 are combined to manufacture first metal mold 500.

It is to be noted that four first metal pieces 580 may have the same or different curvature centers. For example, four first metal pieces 580 may be formed to have the same curvature center. Alternatively, two first metal pieces 580 may be formed to have the same curvature center. In this case, the curvature center of two first metal pieces 580, and the curvature center of the remaining two first metal pieces 580 are different. Alternatively, four first metal pieces 580 having different curvature center may be formed. Through the above-mentioned procedures, first metal mold 500 can be manufactured only by curvilinear processing.

[Configuration of Illumination Apparatus]

Next, illumination apparatus 400 including light-emitting device 100 according to the present embodiment is described.

Figure 12:
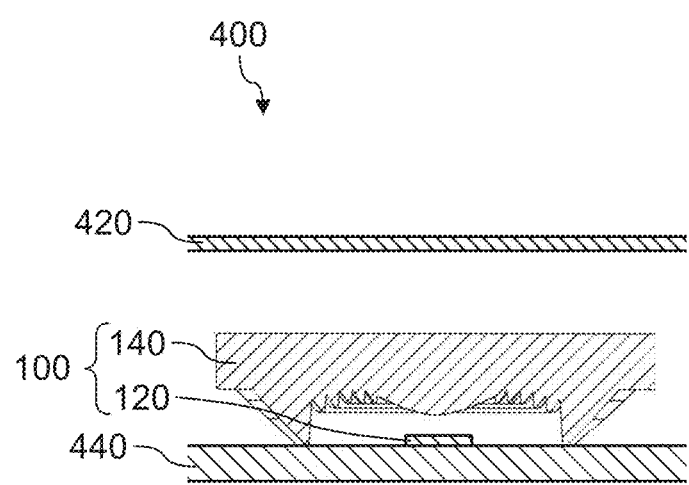
FIG. 12 illustrates a configuration of an illumination apparatus according to Embodiment 1.

FIG. 12 illustrates a configuration of illumination apparatus 400 according to the present embodiment. As illustrated in FIG. 12, illumination apparatus 400 includes a plurality of light-emitting devices 100 and cover 420. As described above, light-emitting device 100 includes light flux controlling member 140 and light emitting element 120. Light emitting element 120 is fixed to substrate 440.

Cover 420 allows light emitted from light-emitting device 100 to pass therethrough while diffusing the light, and protects light-emitting device 100. Cover 420 is disposed on the light path of light emitted from light-emitting device 100. The material of cover 420 is not limited as long as the above-mentioned functions can be obtained. Examples of the material of cover 420 include light transmissive resins such as polymethylmethacrylate (PMMA), polycarbonate (PC), and epoxy resin (EP); and glass.

(Effect)

As described above, in light flux controlling member 140 of the present embodiment, protrusion 146 is formed such that ridgeline 146d has an arc shape, and therefore light flux controlling member 140 can be manufactured only with curvilinear processing. In addition, in light flux controlling member 140, protrusion 146 is provided in a substantially quadrangular shape, and therefore the irradiation region can be illuminated in a quadrangular shape. Further, in light flux controlling member 140, ridgeline 146d is provided to protrude to the inside, and therefore the four corners of the quadrangle (square) can be uniformly and efficiently illuminated.

In addition, with light flux controlling member 140 of the present embodiment, it is possible to adjust the distribution of light in the quadrangular irradiation region by adjusting the length of the curvature radius of ridgeline 146d and the orientation of the arc of ridgeline 146d (whether it protrudes toward central axis CA side or toward the outside of virtual quadrangle S).

(Modification)

A light-emitting device and an illumination apparatus according to a modification of Embodiment 1 differ from light-emitting device 100 and illumination apparatus 400 according to Embodiment 1 in the shape of light flux controlling member 640. Therefore, the same components as those of light-emitting device 100 and illumination apparatus 400 according to Embodiment 1 are denoted by the same reference numerals and descriptions thereof are omitted. New components of light flux controlling member 640 are mainly described below. Light flux controlling member 640 according to the modification of Embodiment 1 differs from light flux controlling member 140 according to Embodiment 1 in that wall parts 642 that separate adjacent protrusions are provided on respective virtual lines L.

(Configuration of Light Flux Controlling Member)

Figure 13:
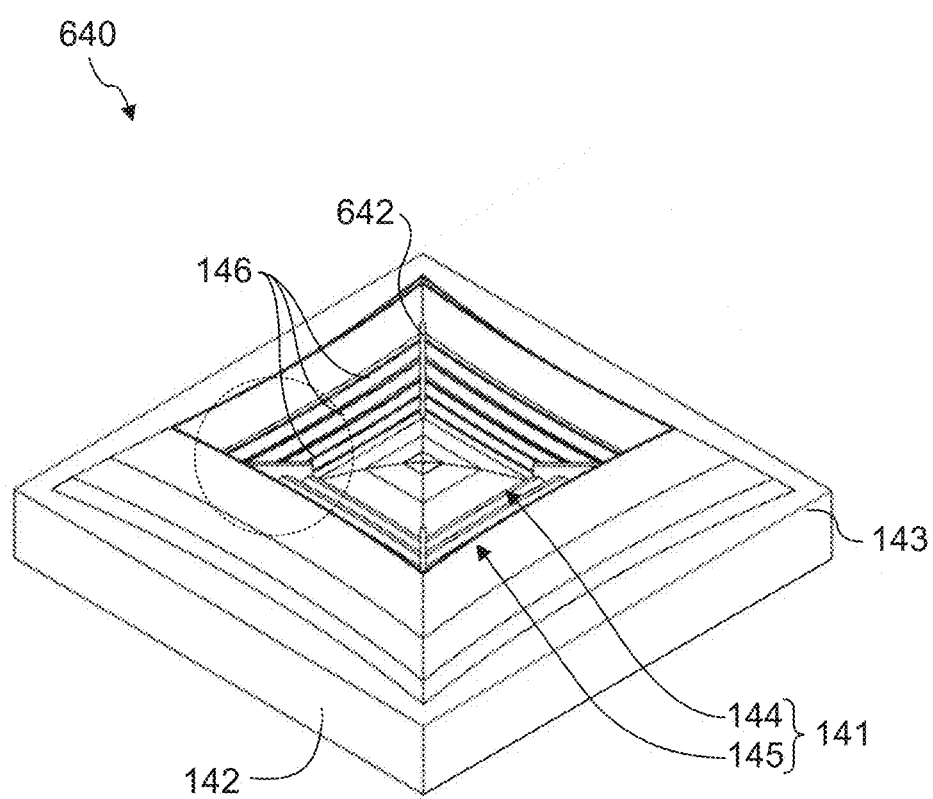
FIG. 13 is a perspective view of a light flux controlling member according to the modification of Embodiment 1.
Figure 14A:
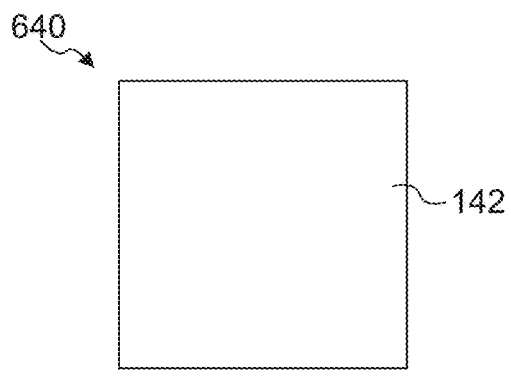
FIGS. 14A to 14D illustrate a configuration of the light flux controlling member according to the modification of Embodiment 1.
Figure 14B:
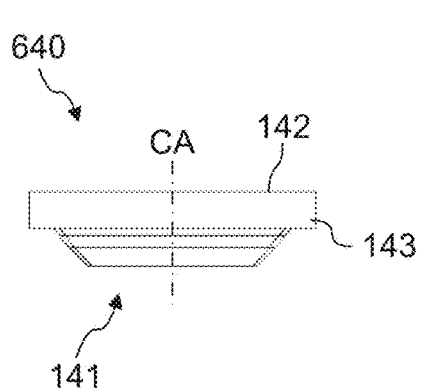
Figure 14C:
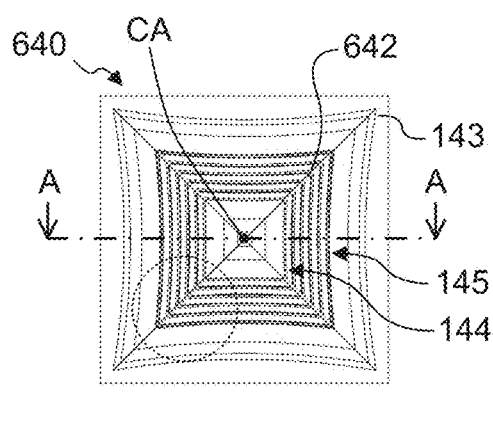
Figure 14D:
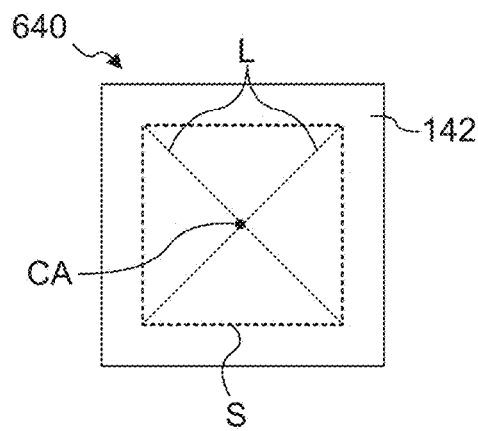
Figure 15A:
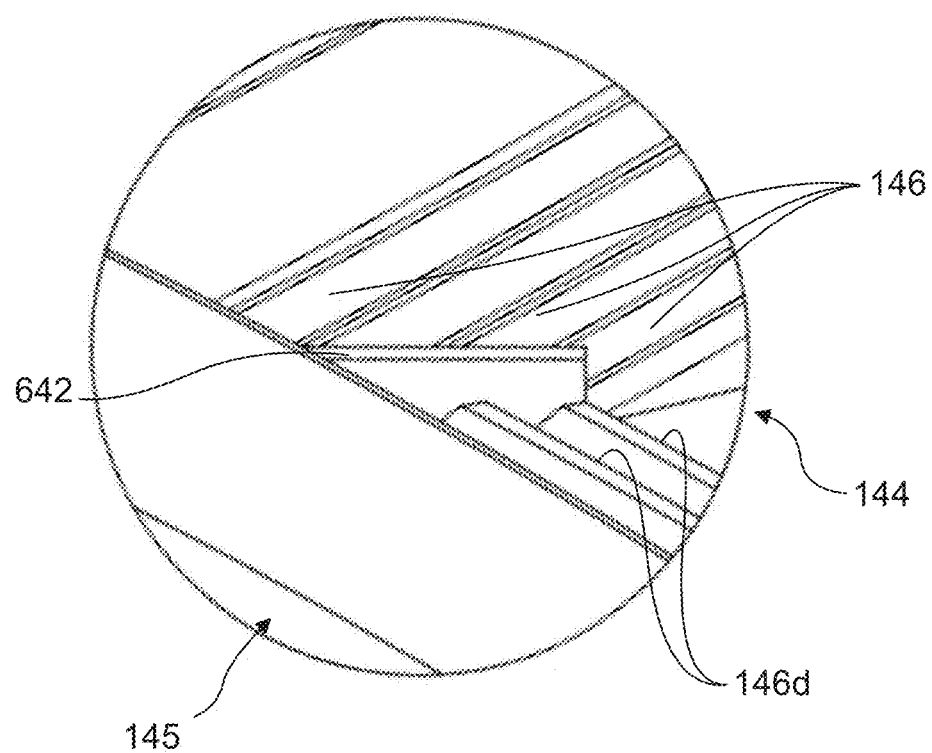
FIGS. 15A and 15B are partially enlarged views of the light flux controlling member according to the modification of Embodiment 1.
Figure 15B:
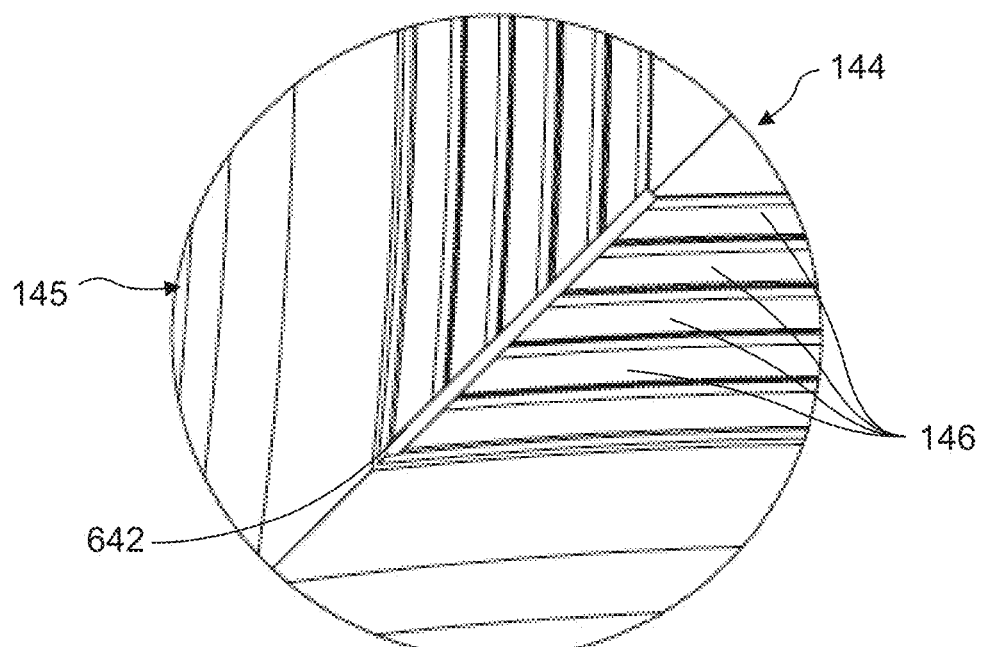

FIG. 13 to FIG. 15B illustrate a configuration of a light flux controlling member according to the modification of Embodiment 1 of the present invention. FIG. 13 is a perspective view of light flux controlling member 640 according to the modification of Embodiment 1. FIG. 14A to 14C are a plan view, a side view, and a bottom view of light flux controlling member 640, respectively, and FIG. 14D is a bottom view of light flux controlling member 640 in which refraction part 144 and Fresnel lens part 145 are omitted. FIG. 15A is an enlarged view of a part indicated by a broken line in FIG. 13, and FIG. 15B is an enlarged view of a part indicated by a broken line in FIG. 14C.

As illustrated in FIG. 13 to FIG. 15B, light flux controlling member 640 according to the modification of Embodiment 1 includes incidence region 141, emission region 142 and flange 143. In addition, incidence region 141 includes refraction part 144 and Fresnel lens part 145.

Fresnel lens part 145 includes a plurality of protrusions 146, and four wall parts 642 disposed on respective four virtual lines L.

Wall part 642 has a predetermined thickness. Wall part 642 is connected with protrusions 146 on both sides. Ridgeline 146d of protrusion 146 is connected with wall part 642 at the top part or the side surface of wall part 642. That is, wall part 642 is set to have a height equal to or greater than the height of protrusion 146 at least at the part where wall part 642 is connected with protrusion 146.

It is to be noted that the height of wall part 642 may be smaller than that of protrusion 146 in a region where it is not connected with protrusion 146. The cross sectional shape of wall part 642 in a cross section orthogonal to virtual line L is not limited, and may be a vertically long rectangular shape or triangular shape, for example. In addition, wall part 642 is continuously provided at least between a connecting part at which it is connected with innermost protrusion 146 and a connecting part at which it is connected with outermost protrusion 146 on virtual line L.

Although not shown in the drawings, the simulation of the light distribution and the illuminance distribution of a light-emitting device including light flux controlling member 640 according to the modification of Embodiment 1 was the same as that of the simulation of the light distribution and the illuminance distribution of light-emitting device 100 including light flux controlling member 140 according to Embodiment 1.

(Effect)

The effect of light flux controlling member 640 according to the modification of Embodiment 1 is the same as that of light flux controlling member 140 of Embodiment 1. In addition, when light flux controlling member 640 according to the modification is manufactured by injection molding, the groove of the mold that corresponds to wall part 642 functions as a passage for degassing. Thus, in light flux controlling member 640 according to the modification, gas is appropriately removed with the part corresponding to wall part 642 of the mold during injection molding, and the cavity is filled with molten resin, and therefore, light flux controlling member 640 can be appropriately manufactured.

Embodiment 2

A light-emitting device and an illumination apparatus according to Embodiment 2 differ from light-emitting device 100 and illumination apparatus 400 according to Embodiment 1 in the shape of light flux controlling member 740. Therefore, the same components as those of light-emitting device 100 and illumination apparatus 400 according to Embodiment 1 are denoted by the same reference numerals and descriptions thereof are omitted. New components of light flux controlling member 740 are mainly described below. Light flux controlling member 740 according to Embodiment 2 differs from light flux controlling member 140 according to Embodiment 1 in that ridgeline 146*d* is provided to protrude toward the outside of light flux controlling member 740.

(Configuration of Light Flux Controlling Member)

Figure 16:
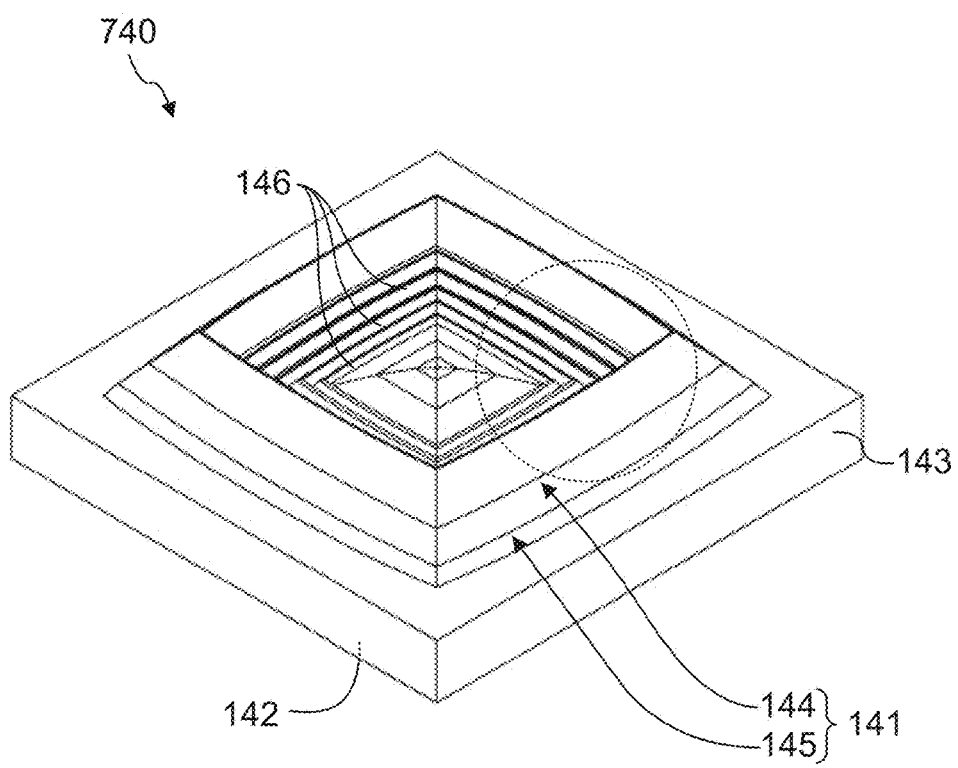
FIG. 16 is a perspective view of a light flux controlling member according to Embodiment 2.
Figure 17A:
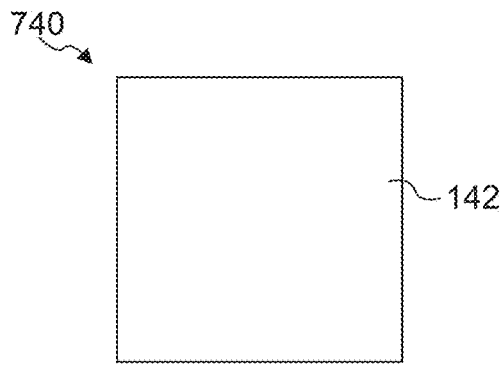
FIGS. 17A to 17D illustrate a configuration of the light flux controlling member according to Embodiment 2.
Figure 17B:
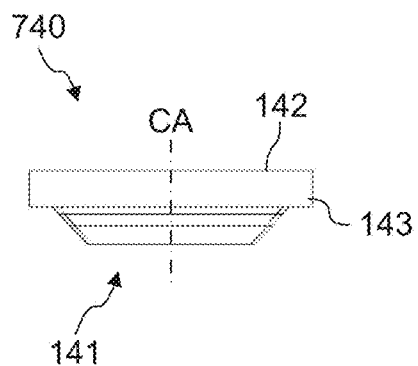
Figure 17C:
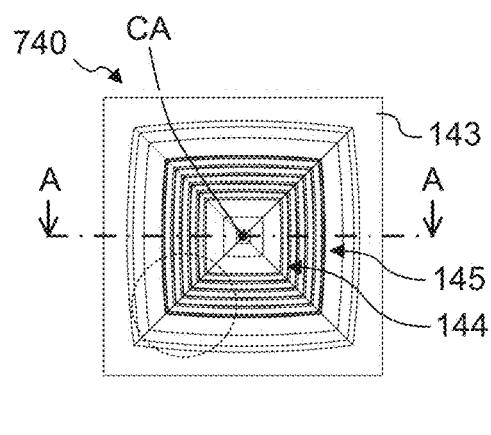
Figure 17D:
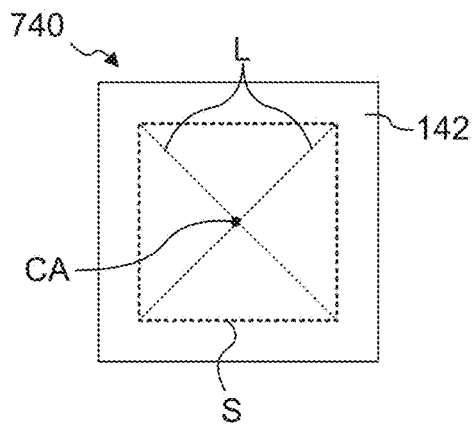
Figure 18A:
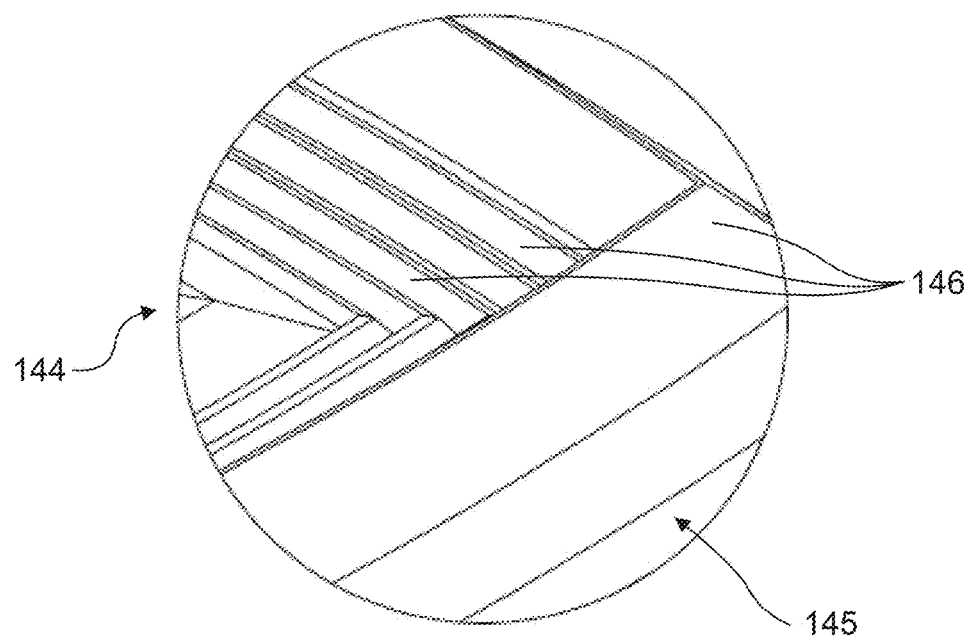
FIGS. 18A and 18B are partially enlarged views of the light flux controlling member according to Embodiment 2.
Figure 18B:
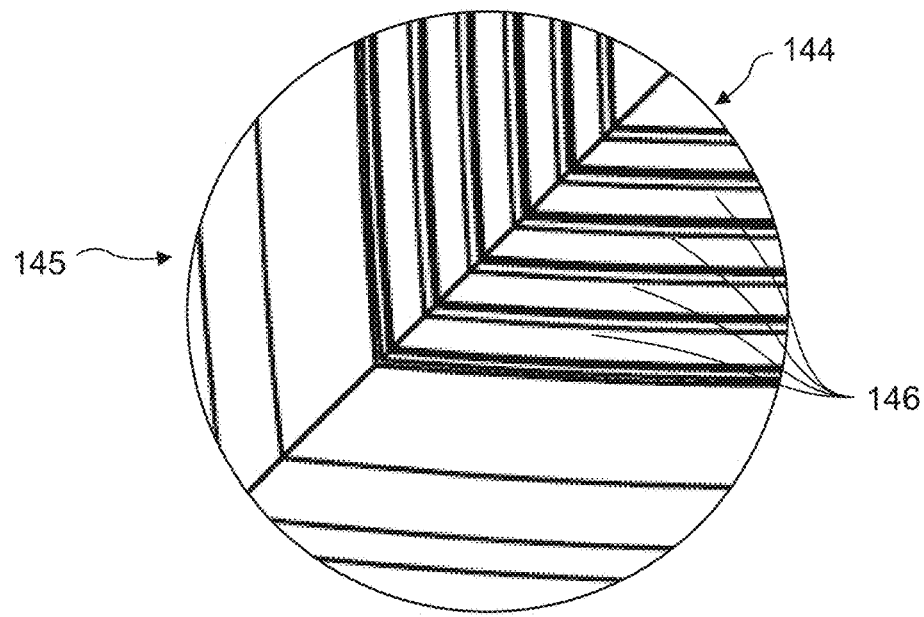

FIG. 16 to FIG. 18B illustrate a configuration of light flux controlling member 740 according to Embodiment 2. FIG. 16 is a perspective view of light flux controlling member 740 according to Embodiment 2. FIG. 17A to 17C are a plan view, a side view, and a bottom view of light flux controlling member 740, respectively, and FIG. 17D is a bottom view of light flux controlling member 740 in which refraction part 144 and Fresnel lens part 145 are omitted. FIG. 18A is an enlarged view of a part indicated by a broken line in FIG. 16, and FIG. 18B is an enlarged view of a part indicated by a broken line in FIG. 17C.

As illustrated in FIG. 16 to FIG. 18B, in light flux controlling member 740 according to Embodiment 2, ridgeline 146*d* is provided to protrude in a direction away from the intersection. That is, the curvature center of the arc is located at a position on a straight line that passes the center of virtual quadrangle S (intersection of the diagonal) and the middle point of one side of virtual quadrangle S, and distant from the arc relative to the center of virtual quadrangle S. With this configuration, first inclined surface 146*a* may not be inclined with respect to central axis CA as described later in detail. That is, first inclined surface 146*a* may be disposed parallel to the central axis. In addition, the radius of the arc may be reduced to 10 mm. It is to be noted that, when the radius of the arc is smaller than 10 mm, desired light distribution characteristics may not be obtained.

In light flux controlling member 740, virtual quadrangle S is set to include incidence region 141 in plan view. For example, virtual quadrangle S is set such that each side of virtual quadrangle S circumscribes the center portion of each side of substantially rectangular Fresnel lens part 145 in plan view.

(Simulation)

The illuminance distribution and the light distribution of a light-emitting device including light flux controlling member 740 according to Embodiment 2 illustrated in FIG. 16 to FIG. 18B were simulated.

Figure 19A:
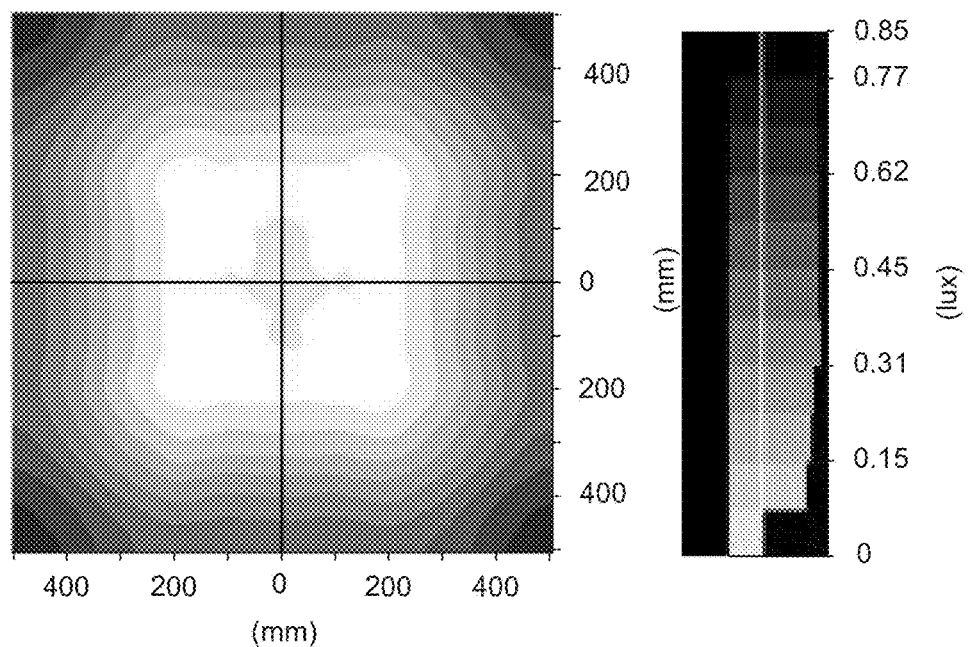
FIGS. 19A and 19B show a simulation of an illuminance distribution of a light-emitting device according to Embodiment 2.
Figure 19B:
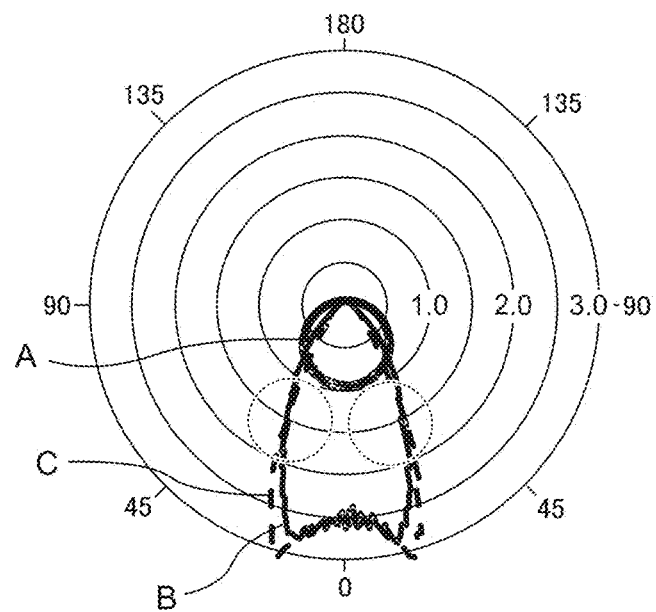

FIGS. 19A and 19B show a simulation of an illuminance distribution of a light-emitting device according to Embodiment 2. FIG. 19A shows a simulation of an illuminance distribution in a case where the irradiation region distanced from the light emitting surface of light emitting element 120 by 1,000 mm is assumed, and FIG. 19B is a simulation of a light distribution of a far field.

The ordinate and abscissa in the left diagram of FIG. 19A indicate the distances (mm) from optical axis LA of light emitting element 120 (central axis CA of light flux controlling member 740). In addition, in the right diagram, the ordinate indicates the illuminance (lux).

In FIG. 19B, the distance from the center of the circle indicates the relative luminous intensity when the luminous intensity in the emission direction along optical axis LA of light emitting element 120 (0° direction) is defined as "1." In addition, the scales in the circumferential direction indicate the angles to optical axis LA of light emitting element 120. In addition, thick solid line A indicates the light distribution characteristics of light emitting element 120, thin solid line B indicates the light distribution characteristics in the direction orthogonal to central axis CA and parallel to one side of virtual quadrangle S, and broken line C indicates the light distribution characteristics in the direction of the diagonal of virtual quadrangle S.

FIG. 19A reveals that a light-emitting device including light flux controlling member 740 according to the present embodiment whose ridgeline 146*d* has an arc shape can illuminate the irradiation region in a quadrangle (square) shape. FIG. 19B reveals that, while the distance between broken line C and thin solid line B in a region enclosed by a broken line is very short, the quadrangular irradiation region can be uniformly illuminated.

(Configuration of Mold)

Next, a mold for forming light flux controlling member 740 according to Embodiment 2 is described. The mold according to Embodiment 2 includes first metal mold 900 and a second metal mold. First metal mold 900 is composed of a combination of four first metal mold pieces 980. The mold according to Embodiment 2 differs from the mold of Embodiment 1 in the configuration of the valley line.

Figure 20A:
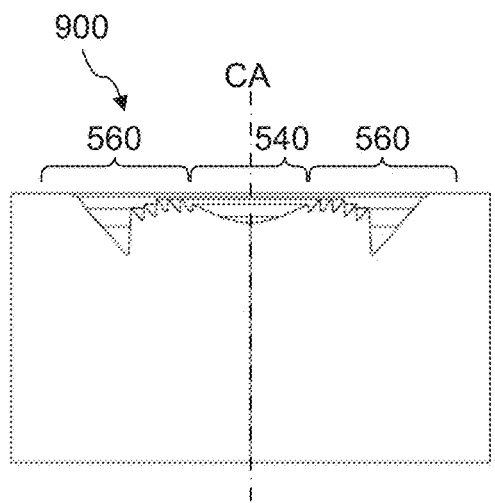
FIGS. 20A to 20D illustrate a configuration of a first metal mold according to Embodiment 2.
Figure 20B:
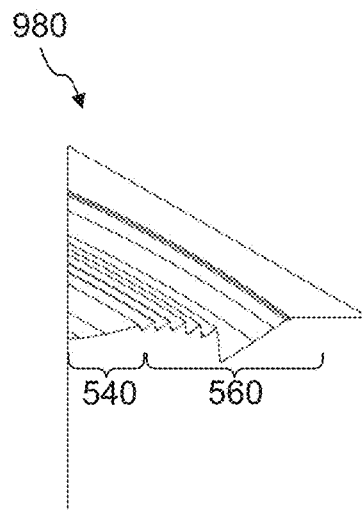
Figure 20C:
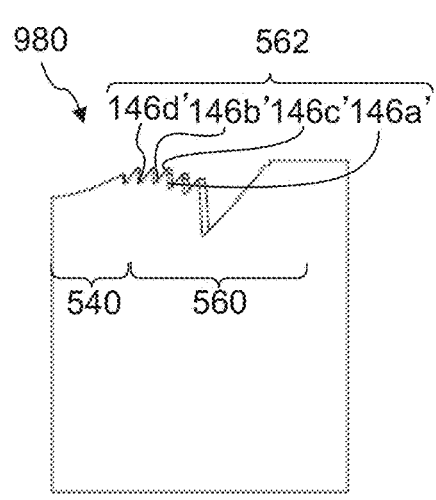
Figure 20D:
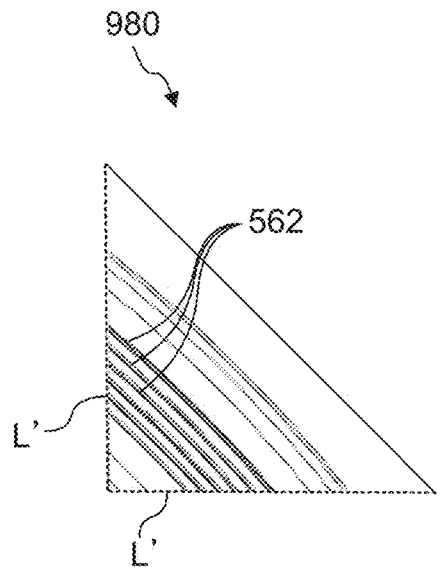

FIGS. 20A to 20D illustrate a configuration of first metal mold 900 of the mold according to Embodiment 2. FIG. 20A is a sectional view of first metal mold 900, FIG. 20B is a perspective view of first metal mold piece 980, FIG. 20C is a side view of first metal mold piece 980, and FIG. 20D is a plan view of first metal mold piece 980.

As illustrated in FIGS. 20A to 20D, in first metal mold 900 of the mold according to Embodiment 2, valley line 146*d*' is provided to protrude to the outside of first metal mold 900. With this configuration, the cutting tool does not interfere with first inclined surface 146*a*' unlike the manufacturing process of first metal mold piece 980 described in Embodiment 1. Therefore, it is not necessary to tilt first inclined surface 146*a* and first inclined surface 146*a*'.

(Effect)

As described above, in light flux controlling member 740 according to Embodiment 2, limitation on manufacturing can be reduced in comparison with light flux controlling member 140 according to Embodiment 1. To be more specific, it is not necessary to tilt first inclined surface 146*a*', and the curvature radius of ridgeline 146*d* can be reduced in comparison with light flux controlling member 140 according to Embodiment 1. Therefore, by adjusting the curvature radius of ridgeline 146d under the condition that the curvature radius of ridgeline 146d is greater than the distance from the middle point of the arc to the intersection of the diagonals of virtual quadrangle S, the illumination apparatus according to Embodiment 2 can meet various demands such as a quadrangular irradiation region having a substantially circular shape in which illuminance at the four corners are suppressed, and a quadrangular irradiation region in which the uniformity of the illumination is high.

(Modification)

A light-emitting device and an illumination apparatus according to a modification of Embodiment 2 differ from the light-emitting device and the illumination apparatus according to Embodiment 2 in the shape of light flux controlling member 840. Therefore, the same components as those of the light-emitting device and the illumination apparatus according to Embodiment 2 are denoted by the same reference numerals and descriptions thereof are omitted. New components of light flux controlling member 840 are mainly described below. Light flux controlling member 840 according to the modification of Embodiment 2 differs from light flux controlling member 840 according to Embodiment 2 in that wall parts 642 that separate adjacent protrusions are provided on respective virtual line L.

(Configuration of Light Flux Controlling Member)

Figure 21:
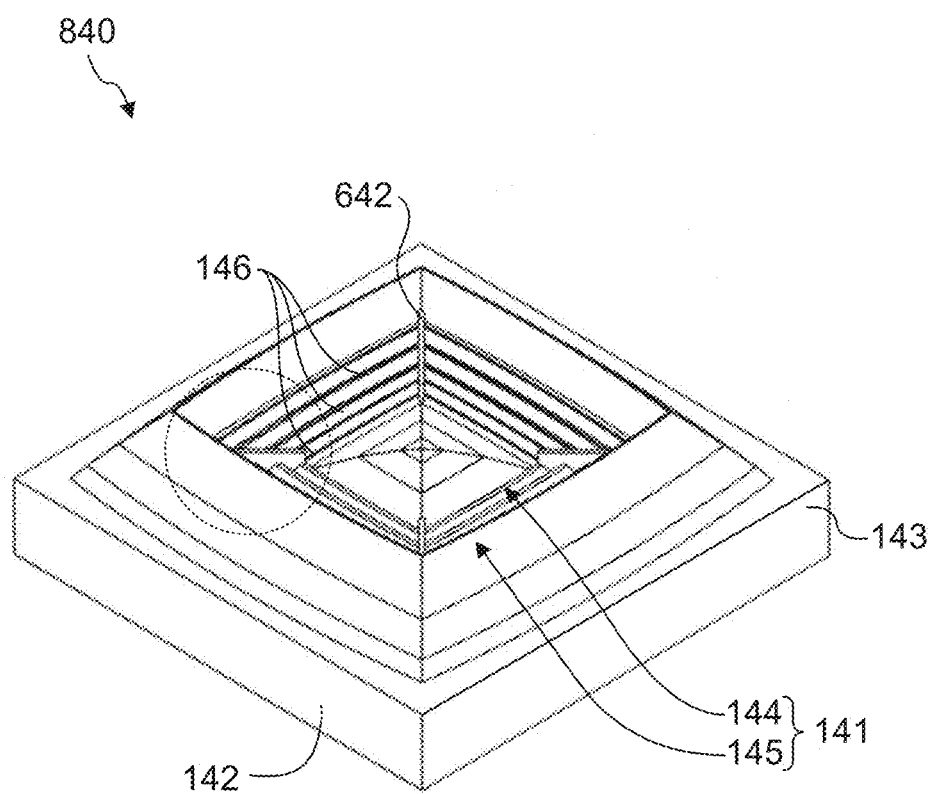
FIG. 21 is a perspective view of a light flux controlling member according to the modification of Embodiment 2.
Figure 22A:
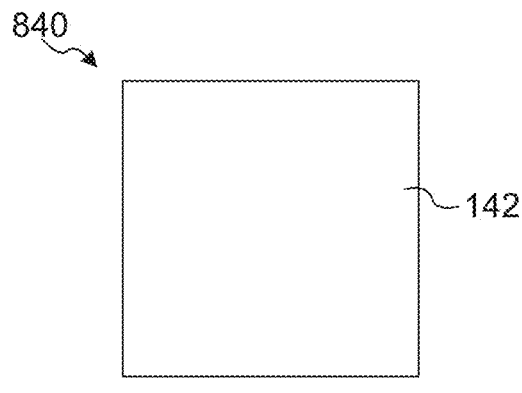
FIGS. 22A to 22D illustrate a configuration of the light flux controlling member according to the modification of Embodiment 2.
Figure 22B:
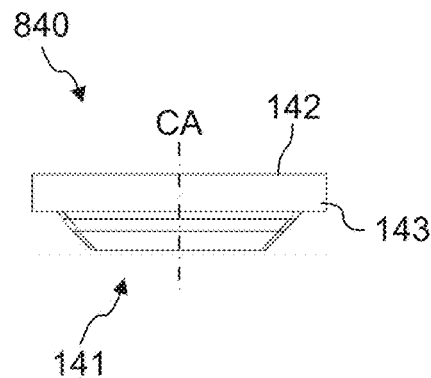
Figure 22C:
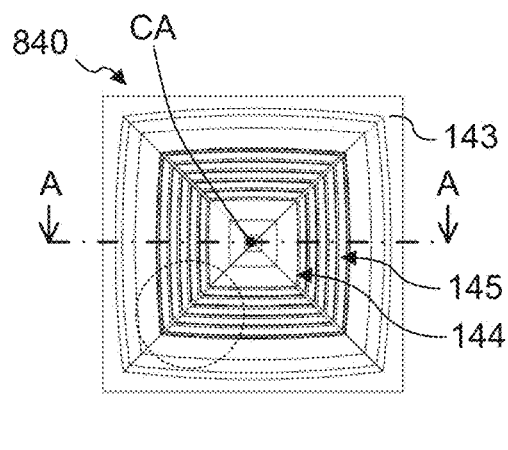
Figure 22D:
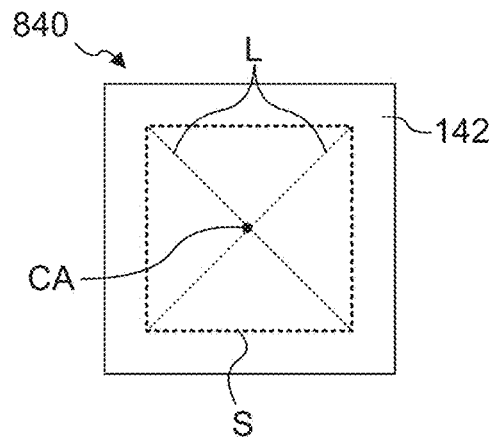
Figure 23A:
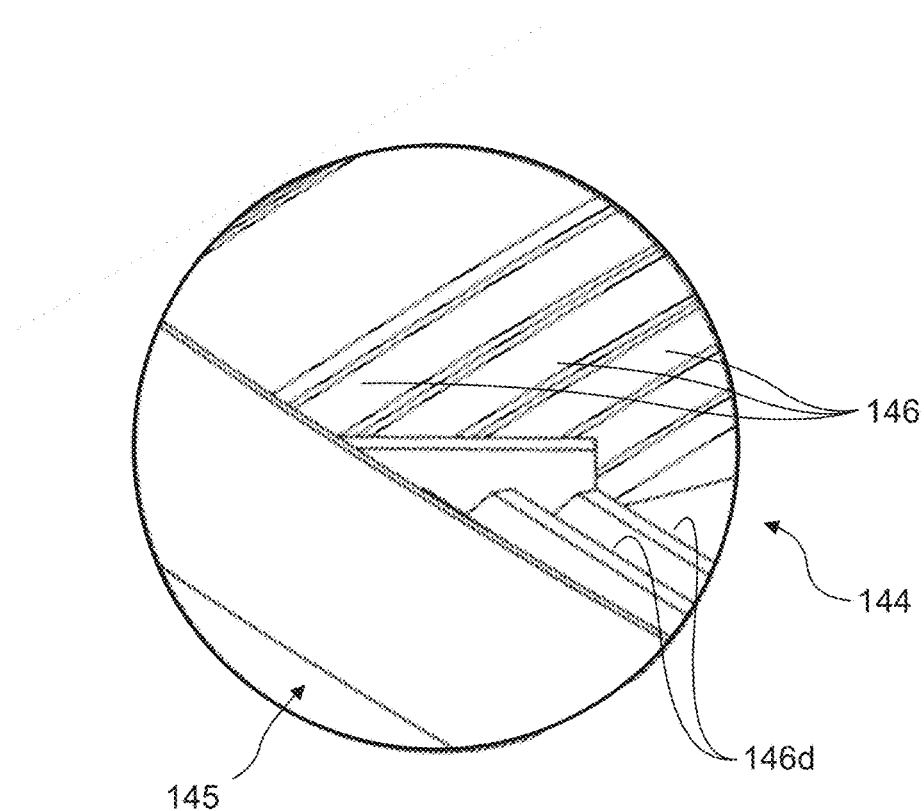
FIGS. 23A and 23B are partially enlarged views of the light flux controlling member according to the modification of Embodiment 2.
Figure 23B:
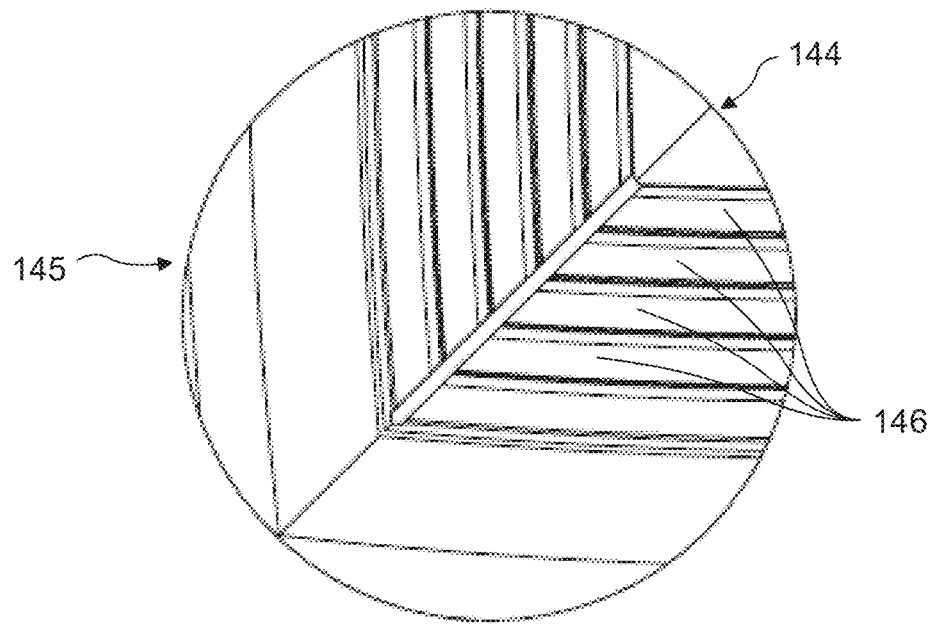
Figure 25A:
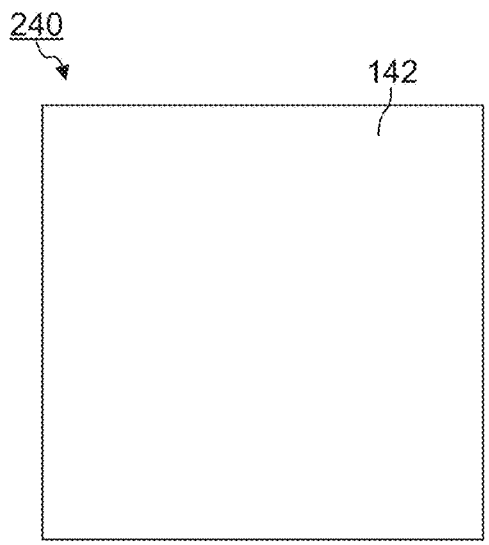
FIGS. 25A to 25C illustrate a configuration of the light flux controlling member according to Embodiment 3.
Figure 25B:
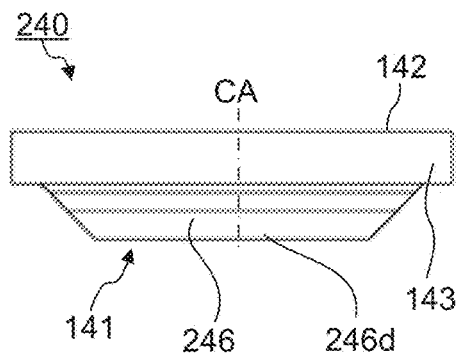
Figure 25C:
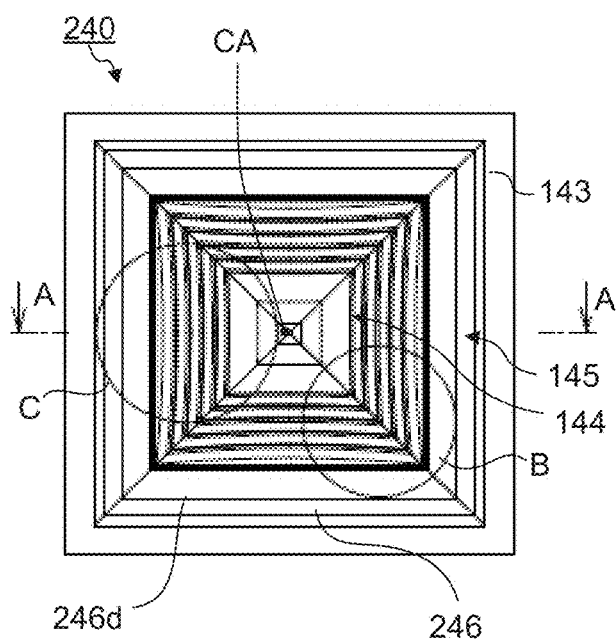

FIG. 21 to FIG. 23B illustrate a configuration of a light flux controlling member according to the modification of Embodiment 2 of the present invention. FIG. 21 is a perspective view of light flux controlling member 840 according to the modification of Embodiment 2. FIGS. 22A to 22C are a plan view, a side view and a bottom view of light flux controlling member 840, respectively, and FIG. 22D is a bottom view of light flux controlling member 840 in which refraction part 144 and Fresnel lens part 145 are omitted. FIG. 23A is an enlarged view of a part indicated by a broken line in FIG. 21, and FIG. 23B is an enlarged view of a part indicated by a broken line in FIG. 22C.

As illustrated in FIG. 21 to FIG. 23B, light flux controlling member 840 according to the modification of Embodiment 2 includes incidence region 141, emission region 142 and flange 143. In addition, incidence region 141 includes refraction part 144 and Fresnel lens part 145.

Fresnel lens part 145 includes a plurality of protrusions 146, and four wall parts 642 disposed on respective virtual lines L and at both ends of protrusions 146.

Wall part 642 has a predetermined thickness. Wall part 642 is connected with protrusions 146 on both sides. Ridgeline 146d of protrusion 146 is connected with wall part 642 at the top part or the side surface of wall part 642. That is, wall part 642 has a height equal to or greater than the height of protrusion 146 at least at the part where wall part 642 is connected with protrusion 146.

It is to be noted that the height of wall part 642 may be smaller than that of protrusion 146 in a region where it is not connected with protrusion 146. The cross sectional shape of wall part 642 in the cross section orthogonal to virtual line L is not limited, and may be a vertically long rectangular shape or triangular shape, for example. In addition, wall part 642 is continuously provided at least between a connecting part at which it is connected with innermost protrusion 146 and a connecting part at which it is connected with outermost protrusion 146 on virtual line L.

Although not shown in the drawings, the simulation of the light distribution and the illuminance distribution of a light-emitting device including light flux controlling member 740 according to the modification of Embodiment 2 was the same as that of the simulation of the light distribution and the illuminance distribution of the light-emitting device including light flux controlling member 740 according to Embodiment 2.

(Effect)

The effect of light flux controlling member 840 according to the modification of Embodiment 2 is the same as that of light flux controlling member 740 of Embodiment 2. In addition, when light flux controlling member 840 according to the modification is manufactured by injection molding, the groove of the mold that corresponds to wall part 642 functions as a passage for degassing. Thus, in light flux controlling member 840 according to the modification, gas is appropriately removed with the part corresponding to the mold during injection molding, and the cavity is filled with molten resin, and therefore, light flux controlling member 840 can be appropriately manufactured.

Embodiment 3

A light-emitting device and an illumination apparatus according to Embodiment 3 differ from light-emitting device 100 and illumination apparatus 400 according to Embodiment 1 in the shape of light flux controlling member 240. Therefore, the same components as those of light-emitting device 100 and illumination apparatus 400 according to Embodiment 1 are denoted by the same reference numerals and descriptions thereof are omitted. New components of light flux controlling member 240 are mainly described below. Light flux controlling member 240 according to Embodiment 3 differs from light flux controlling member 140 according to Embodiment 1 in that outermost highest protrusion 146 of the plurality of protrusions 146 is replaced by protrusion 246 having linear ridgeline 246d.

(Configuration of Light Flux Controlling Member)

Figure 26A:
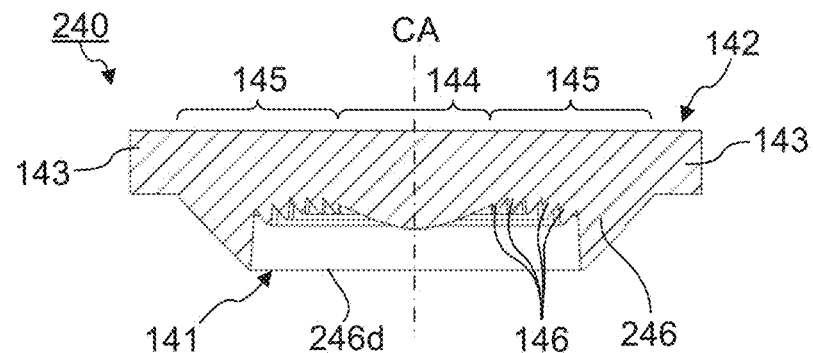
FIG. 26A is a sectional view of the light flux controlling member according to Embodiment 3.
Figure 26B:
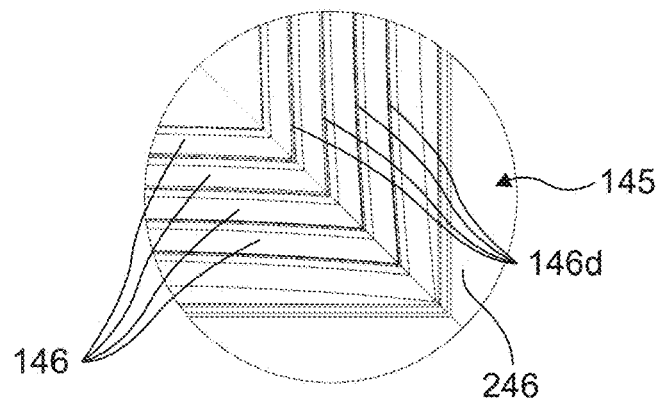
FIGS. 26B and 26C are partially enlarged views of the light flux controlling member according to Embodiment 3.
Figure 26C:
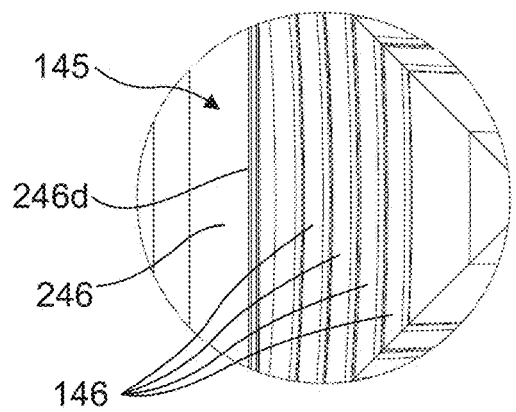

FIG. 24 to FIG. 26C illustrate a configuration of light flux controlling member 240 according to Embodiment 3. FIG. 24 is a perspective view of light flux controlling member 240 according to Embodiment 3. FIG. 25A to 25C are a plan view, a side view and a bottom view of light flux controlling member 240, respectively. FIG. 26A is a sectional view of light flux controlling member 240 according to Embodiment 3 taken along line A-A of FIG. 25C, FIG. 26B is an enlarged view of part B illustrated in FIG. 25C, and FIG. 26C is an enlarged view of part C illustrated in FIG. 25C.

As illustrated in FIG. 24 to FIG. 26C, light flux controlling member 240 includes a plurality of protrusions 146, and highest protrusion 246 disposed at the outermost position. Protrusions other than protrusion 246, that is, protrusions 146 each have arc-shaped ridgeline 146d that protrudes toward central axis CA side in plan view as illustrated in FIG. 26B. Protrusion 246 includes ridgeline 246d. Ridgeline 246d has a linear shape in plan view. Ridgeline 246d is parallel to the straight lines that connect the both ends of respective ridgelines 146d. In addition, the bottom sides of the tilted surfaces of protrusion 246 each have a linear shape and are parallel to ridgeline 246d.

(Simulation)

The illuminance distribution of a light-emitting device including light flux controlling member 240 according to Embodiment 3 illustrated in FIG. 24 to FIG. 26C was simulated.

Figure 27:
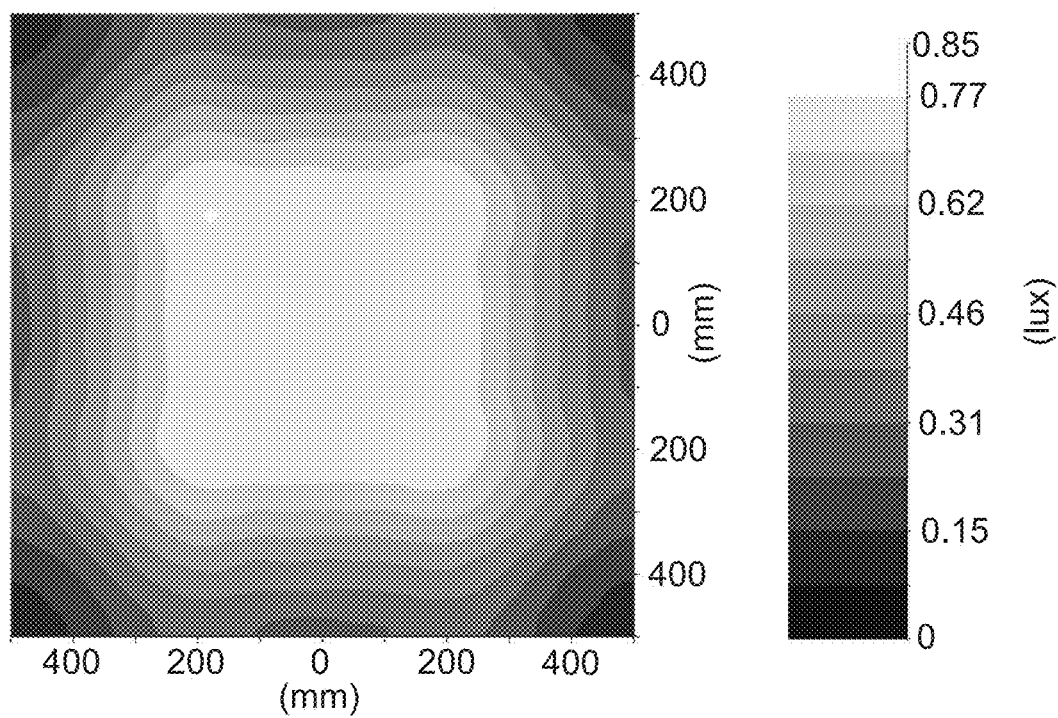
FIG. 27 shows a simulation of an illuminance distribution of a light-emitting device according to Embodiment 3.

FIG. 27 shows a simulation of an illuminance distribution of a light-emitting device according to Embodiment 3. FIG. 27 shows a simulation of an illuminance distribution in a case where the irradiation region distanced from the light emitting surface of light emitting element 120 by 1,000 mm is assumed. The ordinate and abscissa in the left diagram of FIG. 27 indicate the distances (mm) from optical axis LA of light emitting element 120 (central axis CA of light flux controlling member 240). In addition, in the right diagram of FIG. 27, the ordinate indicates the illuminance (lux).

FIG. 27 reveals that a light-emitting device including light flux controlling member 240 having arc-shaped protrusion 146 protruding to central axis CA side and linear protrusion 246 disposed on the outer side of protrusion 146 can illuminate the irradiation region in a quadrangle (square) shape. Although the illuminance of the irradiation region of the present embodiment is slightly lower than that of the illuminance of Embodiments 1 and 2, the uniformity of the illuminance of the irradiation region of the present embodiment is equal to that of Embodiments 1 and 2.

(Configuration of Mold)

Next, a mold for forming light flux controlling member 240 according to Embodiment 3 is described. The mold according to Embodiment 3 differs from the mold of Embodiment 1 in that an outermost deepest recess of first metal mold piece 280 corresponding to outermost highest protrusion 246 of light flux controlling member 240 is formed such that the valley line of the recess is a straight line in plan view, and that first metal mold piece 280 can be separated into first core part 281 and second core part 282.

Figure 28A:
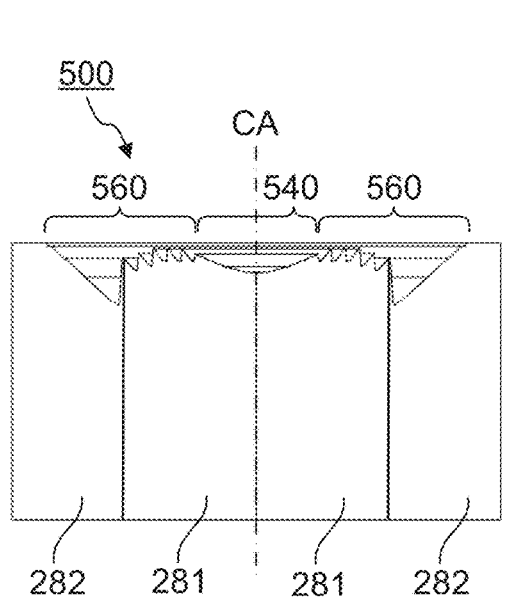
FIGS. 28A to 28D illustrate a configuration of a first metal mold according to Embodiment 3.
Figure 28B:
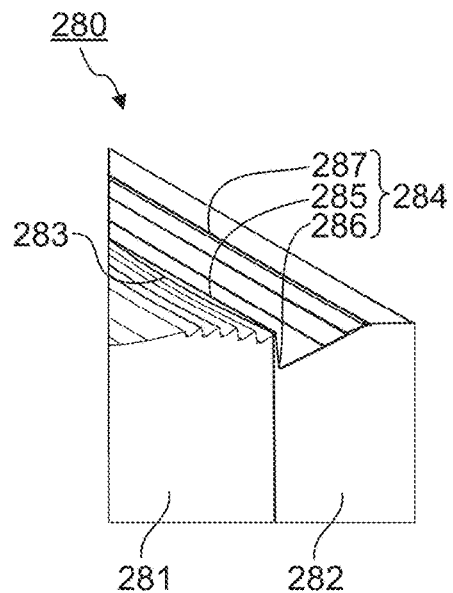
Figure 28C:
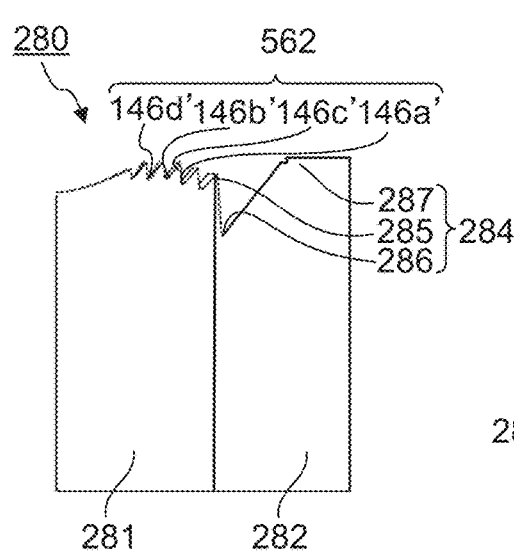
Figure 28D:
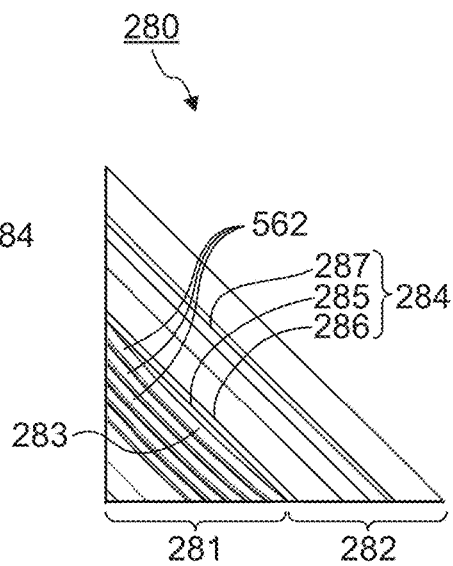

FIG. 28A is a sectional view of first metal mold 500, FIG. 28B is a perspective view of first metal mold piece 280, FIG. 28C is a side view of first metal mold piece 280, and FIG. 28D is a plan view of first metal mold piece 280.

First metal mold piece 280 has an isosceles triangle shape in plan view. In the present embodiment, the external shape of the Fresnel lens part is square in plan view, and therefore the angle between the two equal sides is right angle. As illustrated in FIG. 28B and FIG. 28D, first metal mold piece 280 is composed of first core part 281 that has a smaller rectangular equilateral triangular shape in plan view, and second core part 282 that is disposed on the outer side of first core part 281 and has a trapezoid shape in plan view.

First core part 281 is bonded with second core part 282 such that a flat first mating surface that is the oblique side of first core part 281 having a rectangular equilateral triangle shape in plan view and a flat second mating surface that is the top side (short side) of second core part 282 having a trapezoidal shape in plan view are in contact with each other.

First core part 281 includes recesses 562 and a part of refraction part forming region 540. Recesses 562 correspond to protrusions 146 of light flux controlling member 240, and outermost arc shaped ridgeline 283 of recesses 562 is provided to connect the two vertexes of the oblique side of the rectangular equilateral triangle of first core part 281 (the both ends of the top side of the trapezoid of second core part 282).

As illustrated in FIGS. 28B to 28D, second core part 282 includes recess 284 corresponding to protrusion 246 of light flux controlling member 240. Recess 284 includes inner ridgeline 285, valley line 286 and outer ridgeline 287. Inner ridgeline 285 is located at the top side (short side) of the trapezoid in plan view. Valley line 286 corresponds to ridgeline 246d of protrusion 246 of light flux controlling member 240. Inner ridgeline 285, valley line 286 and outer ridgeline 287 are in parallel with each other in plan view.

As with first metal mold piece 580 of Embodiment 1, first core part 281 is manufactured by lathe processing. In second core part 282, protrusions and recesses having a size greater than that of the recesses of first core part 281 corresponding to protrusions 146 of light flux controlling member 240 are formed in a linear shape. Therefore, second core part 282 is manufactured by linear processing such as machining.

(Effect)

As described above, as with light flux controlling member 140 according to Embodiments 1 and 2, light flux controlling member 240 according to Embodiment 3 can form a quadrangular irradiation region in which the uniformity of the illumination is high. In addition, light flux controlling member 240 according to Embodiment 3 can be manufactured with use of first metal mold piece 280 in which first core part 281 for forming the arc-shaped protrusion and second core part 282 for forming the linear protrusion can be separated.

As described above, second core part 282 can be manufactured by linear processing. In addition, since second core part 282 corresponds to largest protrusion 246 in light flux controlling member 240, the linear processing does not require a special processing machine for minute working. Therefore, the linear processing can be performed using commonly used processing machines, or the linear processing machine that has been owned by the user.

Further, in comparison with lathe processing, the linear processing can provide higher processing accuracy and a shorter processing time for the linear part. Thus, the cost of the mold is reduced and the manufacturing time for the mold is shortened, which are advantageous in terms of enhancement of the productivity of a light flux controlling member that forms a quadrangular irradiation region in which the uniformity of the illumination is high.

Embodiment 4

A light-emitting device and an illumination apparatus according to the modification of Embodiment 4 differ from light-emitting device 100 and illumination apparatus 400 according to Embodiment 2 in the shape of light flux controlling member 340. Therefore, the same components as those of light-emitting device 100 and illumination apparatus 400 according to Embodiment 2 are denoted by the same reference numerals and descriptions thereof are omitted. New components of light flux controlling member 340 are mainly described below. Light flux controlling member 340 according to Embodiment 4 differs from light flux controlling member 140 according to Embodiment 2 in that outermost highest protrusion 146 of the plurality of protrusions 146 is replaced by protrusion 246 having linear ridgeline 246d.

(Configuration of Light Flux Controlling Member)

Figure 29:
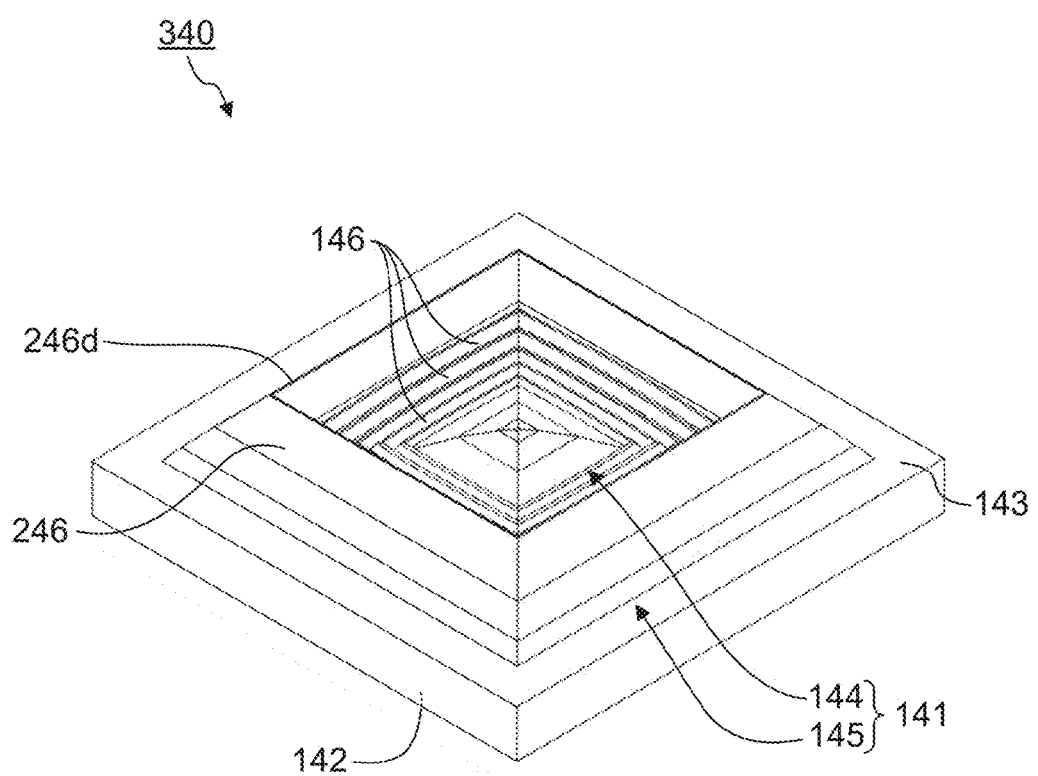
FIG. 29 is a perspective view of a light flux controlling member according to Embodiment 4.
Figure 30A:
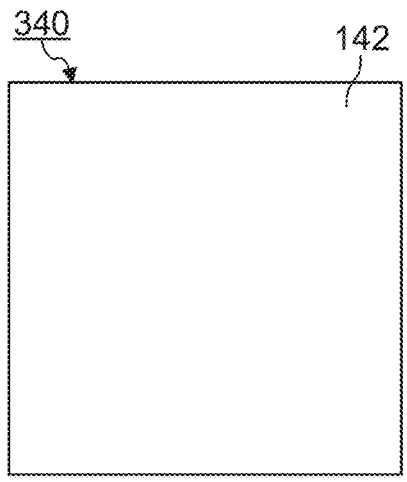
FIGS. 30A to 30C illustrate a configuration of the light flux controlling member according to Embodiment 4.
Figure 30B:
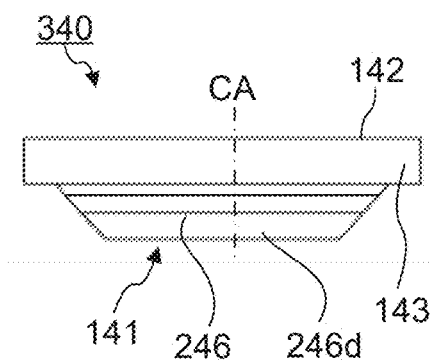
Figure 30C:
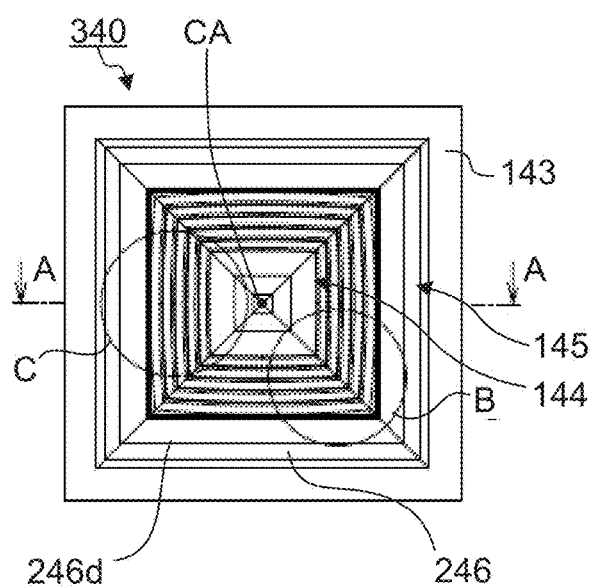
Figure 31A:
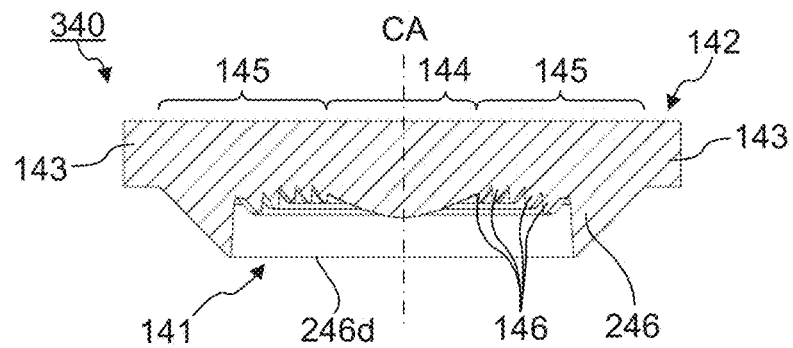
FIG. 31A is a sectional view of the light flux controlling member according to Embodiment 4.
Figure 31B:
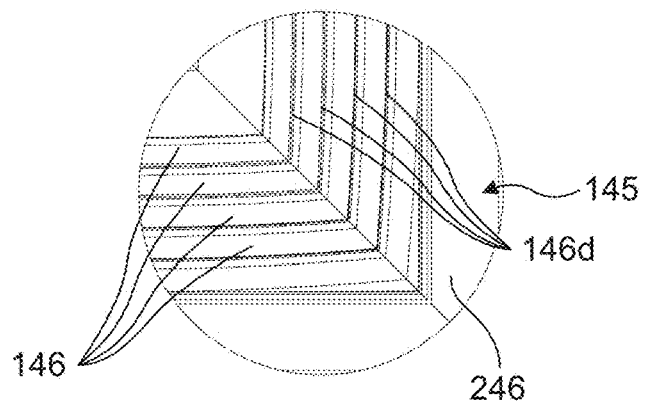
FIGS. 31B and 31C are partially enlarged views of the light flux controlling member according to Embodiment 4.
Figure 31C:
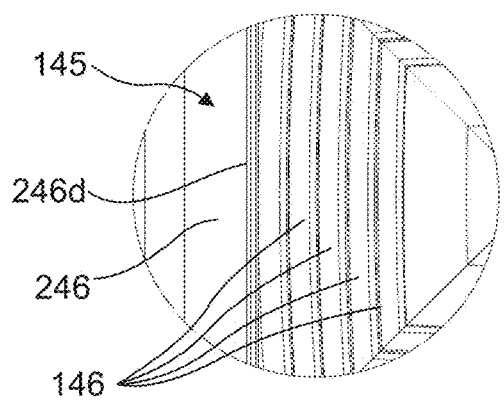

FIG. 29 to FIG. 31C illustrate a configuration of light flux controlling member 340 according to Embodiment 4. FIG. 29 is a perspective view of light flux controlling member 340 according to Embodiment 4. FIGS. 30A to 30C are a plan view, a side view and a bottom view of light flux controlling member 340, respectively. FIG. 31A is a sectional view of light flux controlling member 340 according to Embodiment 4 taken along line A-A of FIG. 30C, FIG. 31B is an enlarged view of part B illustrated in FIG. 30C, and FIG. 31C is an enlarged view of part C illustrated in FIG. 30C.

As illustrated in FIG. 29 to FIG. 31, light flux controlling member 340 includes a plurality of protrusions 146, and highest protrusion 246 disposed at the outermost position. As illustrated in FIG. 31B, protrusions other than protrusion 246, that is, protrusions 146 each have arc-shaped ridgeline 146d that protrudes toward the outside in plan view. Protrusion 246 includes ridgeline 246d. Ridgeline 246d has a linear shape in plan view. Ridgeline 246d is parallel to the straight lines that connect the both ends of respective ridgelines 146d. In addition, the both bottom sides of the tilted surfaces of protrusion 246 each have a linear shape and are parallel to ridgeline 246d.

(Simulation)

An illuminance distribution of a light-emitting device including light flux controlling member 340 according to Embodiment 4 illustrated in FIG. 29 to FIG. 31C was simulated.

Figure 32:
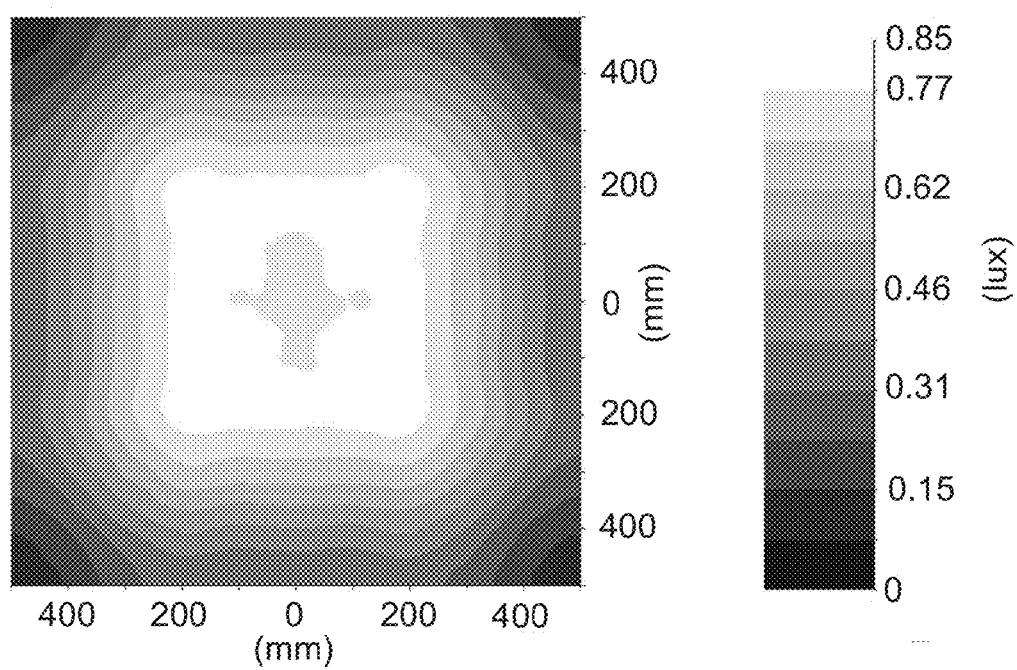
FIG. 32 shows a simulation of an illuminance distribution of a light-emitting device according to Embodiment 4.

FIG. 32 shows a simulation of an illuminance distribution of a light-emitting device according to Embodiment 4. FIG. 32 shows a simulation of an illuminance distribution in a case where the irradiation region distanced from the light emitting surface of light emitting element 120 by 1,000 mm is assumed. The ordinate and abscissa in the left diagram of FIG. 32 indicate the distances (mm) from optical axis LA of light emitting element 120 (central axis CA of light flux controlling member 340). In addition, in the right diagram of FIG. 32, the ordinate indicates the illuminance (lux).

FIG. 32 reveals that the light-emitting device including light flux controlling member 340 having arc-shaped protrusion 146 protruding to the outside and linear protrusion 246 disposed on the outer side of protrusion 146 can illuminate the irradiation region in a quadrangle (square) shape. The illuminance of the irradiation region of the present embodiment is equal to that of Embodiments 1 and 2. In addition, the uniformity of the illuminance of the irradiation region of the present embodiment is equal to that of Embodiments 1 and 2.

(Configuration of Mold)

Next, a mold for forming light flux controlling member 340 according to Embodiment 4 is described. The mold according to Embodiment 4 differs from the mold of Embodiment 2 in that an outermost deepest recess of first metal mold piece 380 corresponding to outermost highest protrusion 246 of light flux controlling member 340 is formed such that the valley line of the recess is a straight line in plan view, and that first metal mold piece 380 can be separated into first core part 381 and second core part 382.

Figure 33A:
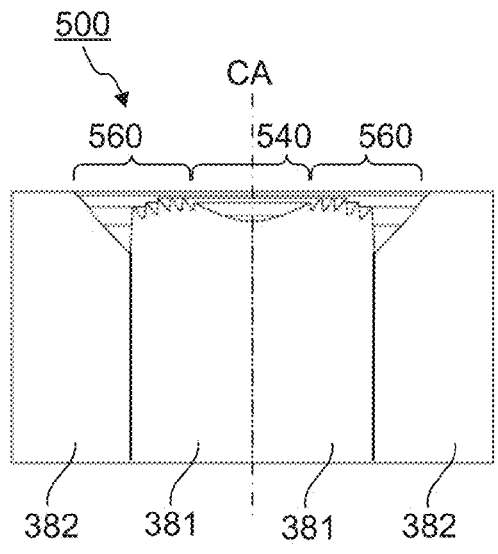
FIGS. 33A to 33D illustrate a configuration of a first metal mold according to Embodiment 4.
Figure 33B:
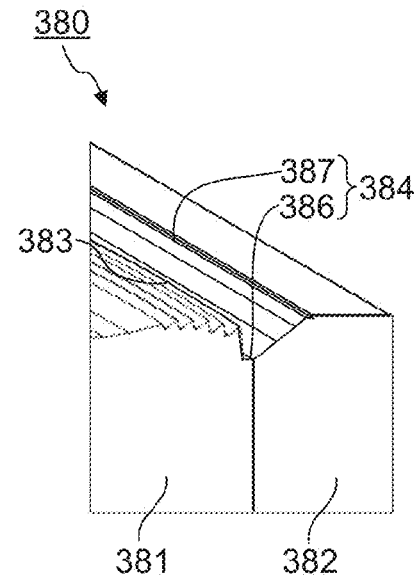
Figure 33C:
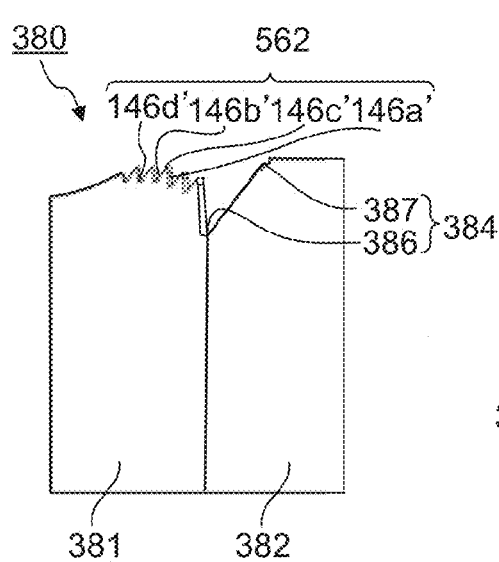
Figure 33D:
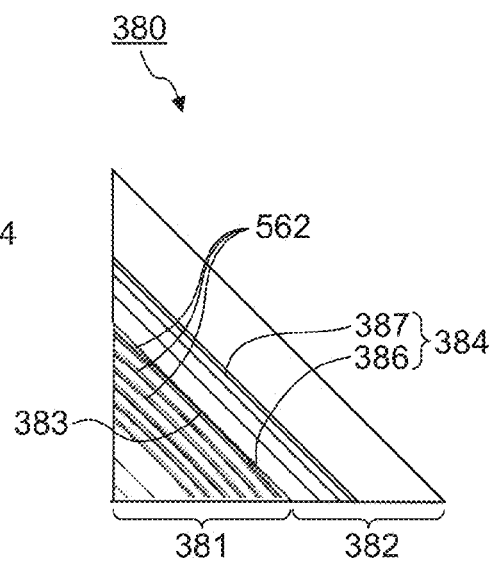

FIG. 33A is a sectional view of first metal mold 500, FIG. 33B is a perspective view of first metal mold piece 380, FIG. 33C is a side view of first metal mold piece 380, and FIG. 33D is a plan view of first metal mold piece 380.

First metal mold piece 380 has an isosceles triangle shape in plan view. In the present embodiment, the external shape of the Fresnel lens part is square in plan view, and therefore the angle between the two equal sides is right angle. As illustrated in FIG. 33B and FIG. 33D, first metal mold piece 380 is composed of first core part 381 that has a smaller rectangular equilateral triangular shape in plan view, and second core part 382 that is disposed on the outer side of first core part 381 and has a trapezoid shape in plan view.

First core part 381 is bonded with second core part 382 such that a flat first mating surface that is the oblique side of first core part 381 having a rectangular equilateral triangle shape in plan view and a flat second mating surface that is the top side (short side) of second core part 382 having a trapezoidal shape in plan view are in contact with each other.

First core part 381 includes recesses 562 and a part of refraction part forming region 540. Recesses 562 correspond to protrusions 146 of light flux controlling member 240, and in plan view, outermost arc-shaped ridgeline 383 of recesses 562 is provided to make contact with the center portion of the oblique side of the rectangular equilateral triangle of first core part 381 (the top side of the trapezoid of second core part 382).

As illustrated in FIG. 33B to FIG. 33D, second core part 382 includes recess 384 corresponding to protrusion 246 of light flux controlling member 340. Recess 384 includes valley line 386 and outer ridgeline 387. Valley line 386 is located at the top side of the trapezoid in plan view. Valley line 386 corresponds to ridgeline 246d of protrusion 246 of light flux controlling member 340. Valley line 386 and outer ridgeline 387 are in parallel with each other in plan view.

As with first metal mold piece 980 of Embodiment 2, first core part 381 is manufactured by lathe processing. In second core part 382, protrusions and recesses having a size greater than that of the recesses of first core part 381 corresponding to protrusions 146 of light flux controlling member 340 are formed in a linear shape. Therefore, second core part 382 is manufactured by linear processing such as machining.

(Effect)

As described above, as with light flux controlling member 140 according to Embodiments 1 and 2, light flux controlling member 340 according to Embodiment 4 can form a quadrangular irradiation region in which the uniformity of the illumination is high. In addition, light flux controlling member 340 according to Embodiment 4 is advantageous in terms of enhancement of the productivity of a light flux controlling member that forms a quadrangular irradiation region in which the uniformity of the illumination is high as with Embodiment 3.

While it is assumed that virtual quadrangles S and S' are provided in Fresnel lens part 145 and Fresnel lens part forming region 560 in Embodiment 1 and Embodiment 2, effects similar to that of the present invention can be achieved with virtual n angles (where n=3 and integer of 5 or more).

While the first core part has an isosceles (right) triangle shape in plan view in Embodiment 3 and Embodiment 4, the shape of the first core part in plan view in the present invention is not limited to the isosceles triangle. In the present invention, the shape of the first core part in plan view may be appropriately set in accordance with the shape of outermost protrusion 146 of the Fresnel lens part in plan view.

While the mating surface of the first core part and the second core is a plane in Embodiments 3 and 4, the shape of the mating surface is not limited as long as the core parts can be engaged with each other. In addition, the position and the number of protrusions having the ridgeline linearly formed in the second core part may be appropriately set as long as the protrusion has a size enough to be formed with a mold formed by linear processing.

While the first metal mold piece is formed by separately forming the first core part and the second core part such that curvilinear processing and linear processing can be simultaneously performed with use of different processing machines in Embodiments 3 and 4, the configuration of the first metal mold piece of the embodiments of the present invention is not limited to the above-mentioned configuration in which the core parts can be separated. For example, in the present invention, the first metal mold piece may be produced by integrally forming the first core part and the second core part, and then sequentially performing curvilinear processing and linear processing. In addition, in the present invention, when the metal mold piece further has an outer core disposed on the outer side of the second core part (on the side opposite to the first core part), the second core part may be integrally formed with the outer core.

Further, in the above-mentioned embodiments, emission region 142 may have a flat surface or a surface which is roughened to reduce the unevenness in illuminance on the illuminated surface without deforming the external shape of the irradiation region. The surface roughness of emission region 142 having the roughened surface may be defined by ten-point average roughness $Rz_{JIS}$, arithmetic average roughness Ra, maximum height roughness Rz (which are each a roughness parameter defined in JIS B0601:2013) or the like. For example, ten-point average roughness $Rz_{JIS}$ of emission region 142 which does not deform the external shape of the irradiation region is preferably 3 µm or smaller, more preferably, 1 µm or greater to achieve suitable diffusion effect.

The disclosures of the specification, drawings, and abstract in Japanese Patent Application No. 2013-096863 filed on May 2, 2013 and Japanese Patent Application No. 2013-135054 filed on Jun. 27, 2013 are incorporated herein by reference in their entirety.

INDUSTRIAL APPLICABILITY

The light flux controlling member, the light-emitting device and the illumination apparatus according to the embodiments of the present invention can uniformly and efficiently illuminate a quadrangular irradiation region. The light-emitting device of the embodiments of the present invention is suitable for a flash of a camera and the like, for example. In addition, the illumination apparatus of the embodiments of the present invention is suitable for a commonly-used indoor illumination, a surface light source device for illuminating a liquid crystal panel and the like, for example.

REFERENCE SIGNS LIST

10, 30 Fresnel lens
12, 42, 52 Groove
20, 44 Cylindrical lens
40 First condenser lens
50 Second condenser lens
100 Light-emitting device
120 Light emitting element
140, 140', 240, 340, 640, 740, 840 Light flux controlling member
141 Incidence region
142 Emission region
143 Flange
144 Refraction part
145 Fresnel lens part
146, 246 Protrusion
146a, 146a' First inclined surface
146b, 146b' Second inclined surface
146c, 146c' Third inclined surface
146d, 246d, 283, 383 Ridgeline
146d', 286, 386 Valley line
280, 380, 580, 980 First metal mold piece
281, 381 First core part
282, 382 Second core part
284, 384, 562 Recess
285 Inner ridgeline
287, 387 Outer ridgeline
400 Illumination apparatus
420 Cover
440 Substrate
500, 900 First metal mold
520 Incidence region forming region
540 Refraction part forming region
560 Fresnel lens part forming region
642 Wall part
CA Central axis
LA Optical axis
S (First) virtual quadrangle
S' (Second) virtual quadrangle
L (First) virtual line
L' (Second) virtual line

The invention claimed is:

1. A light flux controlling member that controls a distribution of light emitted from a light emitting element, the light flux controlling member comprising:
an incidence region on which light emitted from the light emitting element is incident; and
an emission region from which light incident on the incidence region is emitted,
wherein the incidence region includes a plurality of protrusions each having a ridgeline connecting two adjacent first virtual lines of four first virtual lines, each of the four first virtual lines connecting a vertex of a first virtual quadrangle with an intersection of diagonals of the first virtual quadrangle,
wherein the plurality of protrusions are disposed such that every two of the plurality protrusions adjacent to each other have a valley part between the two adjacent first virtual lines,
wherein in plan view, at least one of a plurality of ridgelines is a first ridgeline forming one arc shape entirely between the two adjacent first virtual lines connected by the first ridgeline, and
wherein the first ridgeline having curvature radius greater than a distance from the intersection to a middle point of the first ridgeline.

2. The light flux controlling member according to claim 1, wherein the plurality of ridgelines include at least one ridgeline which is the first ridgeline forming the one arc shape entirely between the two adjacent first virtual lines and at least one ridgeline which is a second ridgeline having a linear shape in plan view, and
wherein a first protrusion having the first ridgeline has a height lower than a height of a second protrusion having the second ridgeline, the second protrusion disposed on an outside relative to the first protrusion having the first ridgeline.

3. The light flux controlling member according to claim 1, wherein each of the plurality of ridgelines forms the arc shape entirely between the two adjacent first virtual lines.

4. The light flux controlling member according to claim 1, wherein the first ridgeline protrudes toward the intersection in plan view, and
wherein the first ridgeline has a curvature center on a straight line passing through the intersection and a middle point of one side of the first virtual quadrangle.

5. The light flux controlling member according to claim 1, wherein the first ridgeline protrudes in a direction away from the intersection in plan view, and
wherein the first ridgeline has a curvature center on a straight line passing through the intersection and a middle point of one side of the first virtual quadrangle.

6. The light flux controlling member according to claim 1, wherein ridgelines connecting the two adjacent first virtual lines have the same curvature center.

7. A light-emitting device comprising:
a light emitting element; and
the light flux controlling member according to claim 1, wherein the intersection is on an optical axis of the light emitting element.

8. An illumination apparatus comprising:
the light-emitting device according to claim 7; and
a cover configured to allow light emitted from the light-emitting device to pass therethrough while diffusing the light.

9. A mold for molding the light flux controlling member according to claim 1, the mold comprising
an incidence region molding region for molding the incidence region,
wherein the incidence region molding region includes a plurality of recesses each having a valley line connecting two adjacent second virtual lines of four second virtual lines, each of the four second virtual lines connecting a vertex of a second virtual quadrangle with an intersection of diagonals of the second virtual quadrangle,
wherein the plurality of recesses are disposed in a manner such that every two adjacent recesses form a top part between the two adjacent second virtual lines,
wherein in plan view, at least one of a plurality of valley lines is a first valley line forming one arc shape entirely between the two adjacent second virtual lines connected by the first valley line, and
wherein the first valley line forming a curvature radius greater than a distance from the intersection of the diagonals of the second virtual quadrangle to a middle point of the first valley line.

10. The mold according to claim 9,
wherein the plurality of valley lines include at least one valley line which is the first valley line forming the on arc shape entirely between the two adjacent second virtual lines and at least one valley line which is a second valley line having a linear shape in plan view, and
wherein a first recess having the first valley line has a depth less than a depth of a second recess having the second valley line, the second recess disposed on an outside relative to the first recess having the first valley line.

11. The mold according to claim 9, wherein each of the plurality of valley lines is a valley line having the arc shape.

12. The mold according to claim 9,
wherein the at least one valley lines protrudes toward the intersection in plan view, and
wherein the first valley line has a curvature center on a straight line passing through the intersection of the diagonals of the second virtual quadrangle and a middle point of one side of the second virtual quadrangle.

13. The mold according to claim 9,
wherein the first valley line protrudes in a direction away from the intersection in plan view, and
wherein the first valley line has a curvature center on a straight line passing through the intersection of the diagonals of the second virtual quadrangle and a middle point of one side of the second virtual quadrangle.

* * * * *